United States Patent [19]

Takeuchi

[11] Patent Number: 5,548,573
[45] Date of Patent: Aug. 20, 1996

[54] OPTICAL INFORMATION REPRODUCING APPARATUS PROVIDED WITH LASER POWER CONTROL MEANS FOR DETECTING REFLECTED LIGHT FROM DATA REGION

[75] Inventor: Toyoaki Takeuchi, Sagamihara, Japan

[73] Assignee: Olympus Optical Co., Ltd., Tokyo, Japan

[21] Appl. No.: 334,351

[22] Filed: Nov. 2, 1994

[30] Foreign Application Priority Data

Nov. 4, 1993  [JP]  Japan .................. 5-275594
Mar. 18, 1994 [JP]  Japan .................. 6-048829

[51] Int. Cl.⁶ ...................................... G11B 7/125
[52] U.S. Cl. ............................ 369/116; 369/107
[58] Field of Search ................. 369/13, 116, 110,
369/275.2, 275.4, 275.3, 107, 54, 58, 111, 109

[56] References Cited

U.S. PATENT DOCUMENTS

| | | | |
|---|---|---|---|
| 5,123,007 | 6/1992 | Miyauchi et al. | 369/116 |
| 5,155,722 | 10/1992 | Yoshida | 369/116 |
| 5,323,374 | 6/1994 | Arai et al. | 369/116 |
| 5,410,527 | 4/1995 | Ashinuma | 369/13 |
| 5,422,865 | 6/1995 | Katayama et al. | 369/116 |
| 5,430,696 | 7/1995 | Tokita et al. | 369/13 |

FOREIGN PATENT DOCUMENTS 59-9086   2/1984  Japan .
62-281485 12/1987 Japan .

*Primary Examiner*—Georgia Y. Epps
*Assistant Examiner*—Kim-Kwok Chu
*Attorney, Agent, or Firm*—Armstrong, Westerman, Hattori, McLeland & Naughton

[57] ABSTRACT

An optical information reproducing apparatus for reproducing information from an optical recording medium that has a recording and reproducing and information-rewritable track region, which is composed of a header region having information, such as a sector start mark, track number and sector number, in a pit shape formed when the recording medium has been manufactured and a recording and reproducing user data region that has no pit and enables information to be recorded and reproduced, the optical information reproducing apparatus having a semiconductor laser output control circuit for controlling a quantity of a semiconductor laser beam to be emitted to a predetermined value such that a detected quantity of an emitted semiconductor laser beam is obtained in only the user data region when the quantity of the laser beam emitted by a semiconductor laser that irradiates the recording medium with a semiconductor laser beam is detected.

16 Claims, 10 Drawing Sheets

RECORDING AND REPRODUCING
DATA REGION
(TRACK REGION B)

REPRODUCTION-ONLY
DATA REGION
(TRACK REGION A)

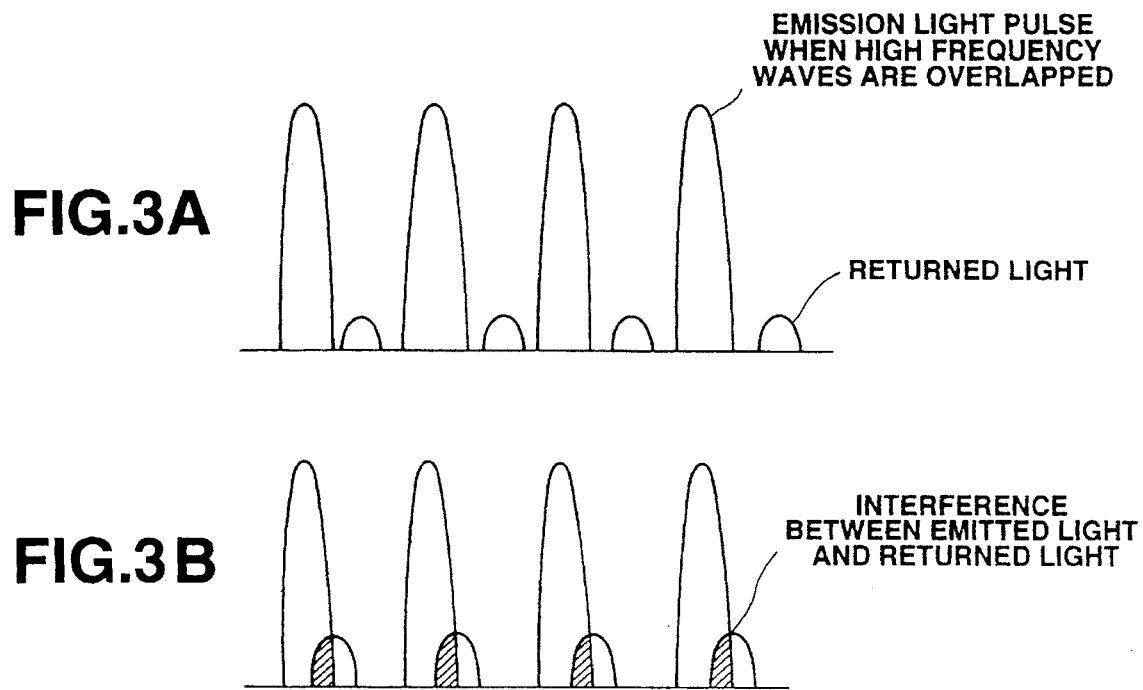
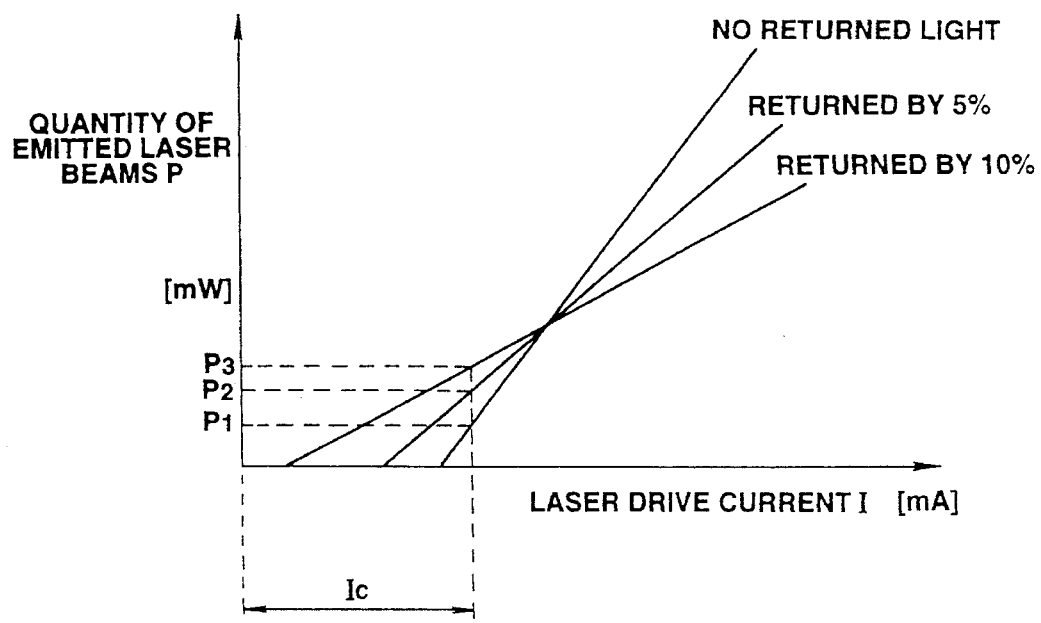

deteriorate the recorded information due to heat of the laser beam emitted to reproduce the information. Therefore, the adequate range allowed for the power for irradiating the user data region with the semiconductor laser beam at the time of reproducing information has been narrowed excessively.

OPTICAL INFORMATION REPRODUCING APPARATUS PROVIDED WITH LASER POWER CONTROL MEANS FOR DETECTING REFLECTED LIGHT FROM DATA REGION

BACKGROUND OF THE INVENTION

1. Field of the Invention

This invention relates to an optical information reproducing apparatus for reproducing information by irradiating a recording medium with a laser beam emitted by a semiconductor laser, and more particularly to a control means of an optical information reproducing apparatus for controlling the quantity of a laser beam to be emitted by a semiconductor laser.

2. Related Art Statement

An optical information reproducing apparatus for optically reproducing information uses, for example, an optical disk to serve as a recording medium. The optical disk is categorized into a type on which information is previously recorded and which enables only reproduction of the information to be performed and a type which enables both recording and reproduction of the same.

Ordinary optical disks of the type, to and from which information can be recorded and reproduced, and which are continuous groove type optical disks conforming to the ISO standard are classified into: fully rewritable disks each having a data region which is formed on the overall surface of the disk and which enables information to be recorded and reproduced; and partially embossed disks containing information formed into pits by a molding process performed at the time of manufacturing the disk and including two types of data regions disposed in a mixed manner on one disk such that data regions, which enables only reproduction of information, and data regions to and from which information can be recorded and reproduced.

A plurality of tracks are formed on the recording surface of the optical disk. The data region of the disk is divided into a predetermined number of tracks and each track is divided into a predetermined number of sectors. Each sector has a header region in the leading portion thereof, the header region including information such as a sector start mark, the track number and the sector number in the form of pits formed at the time of manufacturing the disk. A data region is formed in the rear of the header region, the data region being a region on which data will be recorded. The data region of, for example, the partially embossed disk, has a reproduction-only data region on which information in the form of pits are recorded previously and which enables only reproduction of the information similarly to the header region or a recording and reproducing data region (hereinafter also called a "user data region") to and from which information can be rewritten and reproduced by a photomagnetic method or the like.

In a case where the optical disk having the foregoing structure is a photomagnetic-type optical disk, information in the user data region that enables information to be recorded and reproduced is reproduced by using a Kerr effect. The level of a reproduction signal obtained from the user data region is unsatisfactorily low and suffers from a poor C/N ratio.

In order to improve the C/N ratio and to accurately reproduce information, the power of the laser beam to irradiate the medium at the time of reproducing information must be enlarged. However, enlargement of the power will deteriorate the recorded information due to heat of the laser beam emitted to reproduce the information. Therefore, the adequate range allowed for the power for irradiating the user data region with the semiconductor laser beam at the time of reproducing information has been narrowed excessively.

Since the semiconductor laser involves excessive initial dispersion of the individual characteristics and encounters undesirable change in the characteristics due to change in temperature and as the time passes, the quantity of the laser beam emission must be controlled in order to cause the semiconductor laser to stably emit the laser beam with predetermined power.

A variety of structures have been disclosed to serve as a circuit for controlling the quantity of the laser beam to be emitted by the semiconductor laser, and, for example, an output control circuit has been disclosed in Japanese Patent Laid-Open No. 62-281485 that has an arrangement as shown in FIG. 1.

The disclosed semiconductor laser output control circuit comprises: a semiconductor laser 101, a light detection means 102, on which a portion of a laser beam emitted by the semiconductor laser 101 is made incident; an A/D converter 103 for converting an output signal from the light detection means 102 into a digital signal; a CPU 105 for comparing an output value from the A/D converter 103 and an output value read from a memory 104 at predetermined intervals; a D/A converter 106 for converting the result of the comparison performed by the CPU 105 into an analog signal; and a semiconductor laser drive circuit 107 for supplying an electric current, which is in proportion to an output signal from the D/A converter 106, to the semiconductor laser 101.

In the structure shown in FIG. 1, the CPU 105 changes an instructed value of the output from the D/A converter 106 in such a manner that the error between an actual quantity of the laser beam emitted by the semiconductor laser 101, which is the output value from the A/D converter 103, and a predetermined desired quantity of the semiconductor laser beam read from the memory 104 is made to be zero. Thus, the CPU 105 changes the quantity of an electric current to be supplied to the semiconductor laser 101 so that control for causing the semiconductor laser 101 to stably emit the laser beam with a predetermined desired power is performed.

The optical information reproducing apparatus is operated by a method comprising the steps of: irradiating an information recording surface of the medium with a laser beam; and receiving light reflected by the information recording surface by the light detector so that information is reproduced. It has been known that if light reflected by the medium returns to the semiconductor laser in a quantity larger than a predetermined value, the light emission becomes instable and noise increases in the reproduced signal.

Since the information recording and reproducing apparatus adapted to the photomagnetic method detects an information mark recorded on the optical disk as rotations of a polarizing surface, its optical system for recording and reproducing information cannot employ an isolator optical system in which a polarizing beam splitter and a ¼ wavelength plate are combined with each other to prevent returning of light reflected by the disk to the semiconductor laser. Therefore, in order to overcome the problem caused from returned light, a method disclosed in, for example Japanese Patent Publication No. 59-9086, has been employed which comprises a means that superimposes high frequency components to eliminate the influence of returned light so as to superimpose a high frequency electric current on a drive current for the semiconductor laser at the time of reproducing information so that the interference between emitted semiconductor laser beam and returned light is canceled.

That is, the information recording and reproducing apparatus adapted to the photomagnetic method usually comprises a semiconductor laser output control circuit that has a structure for superimposing a high frequency electric current on the drive current as shown in FIG. 2. The semiconductor laser output control circuit shown in FIG. 2 comprises, in addition to the structure shown in FIG. 1, a high frequency oscillating circuit (HFM) 108 for superimposing a high frequency oscillated electric current on the output electric current from the semiconductor laser drive circuit 107 at the time of reproducing information. Furthermore, the semiconductor laser output control circuit comprises a plurality of D/A converters 109 and 110 for individually controlling the power at the time of reproducing information and the power at the time of recording information.

The semiconductor laser output control circuit shown in FIG. 2 is able to prevent overlap of the emitted laser beam and returned light as shown in FIG. 3A by superimposing a high frequency electric current on the drive current for the semiconductor laser.

However, optical information reproducing apparatuses developed recently tend to comprise a reduced-size and weight pickup unit in order to record and reproduce information at higher speed. Thus, the optical information reproducing apparatus recently uses a pickup unit that is composed of a separated optical system that is separated into: a movable portion comprising an objective lens, an actuator capable of moving the objective lens in the vertical and radial directions and a prism; and a fixed portion composed of an optical portion comprising a semiconductor laser, a collimator lens and a prism and a light detector for extracting a signal from returned light. Although the structure, in which all optical elements are integrally disposed in the movable portion, results in a constant distance from the semiconductor laser to the reflecting surface of the disk, the separated optical system involves change in the distance from the semiconductor laser to the reflecting surface of the disk due to the movement of the movable portion in the radial direction of the disk. Thus, the apparatus of a type comprising the separated optical system encounters a fact that the interference between returned light and the emitted laser beam cannot completely be canceled as shown in FIG. 3B even if the foregoing high frequency superimposing operation is performed. Thus, the quantity of returned light to the semiconductor laser becomes different between a header region in which information is recorded in the form of pits and a user data region that enables information to be recorded and reproduced to and from a land portion thereof having no pit. Therefore, the control for making the electric current to be supplied to the semiconductor laser to be constant cannot completely prevent the change in the quantity of the laser beam to be emitted by the semiconductor laser.

FIG. 4 shows an example of the I-P characteristics (characteristics of the relationship between drive current and quantity of the emitted laser beam) measured in such a manner that an apparatus for making emitted laser beam and returned light to interfere with each other is used to change the quantity of the laser beam returned to the semiconductor laser. The inclination of the I-P characteristics of the semiconductor laser is changed when the quantity of returned light has been changed. If the laser drive current is made to be a constant value of Ic, the quantity of the emitted semiconductor laser increases from P1 to P3 in proportion to the increase in the quantity of returned light. That is, the semiconductor laser sometimes involves the change in the quantity of the emitted laser beam if the quantity of returned light has been changed.

The quantity of returned light from the disk to the semiconductor laser is different between the header region having information in the form of pits and the user data region having no pit and enabling information to be recorded and reproduced. In the header region, the quantity is reduced as compared with the user data region because of the influence of diffraction, while the same is enlarged in the user data region having no pit.

Then, a case will be considered in the circuit having the structure arranged as shown in FIG. 2 such that monitoring of the output from the A/D converter performed by a CPU is stopped, the instructed value of the output from the D/A converter is maintained, that is, the output electric current from the semiconductor laser drive circuit is made to be constant, a laser beam is emitted in a state where the photomagnetic disk is subjected to tracking servo operation, and the quantity of the laser beam emitted by the semiconductor laser is measured in accordance with the output from the light detection means. Since the quantity of the laser beam emitted by the semiconductor laser is, as shown in FIG. 4, changed due to the change in the quantity of light returned to the semiconductor laser in the foregoing case, a phenomenon is sometimes observed, as shown in FIG. 5, that emitted laser beam quantity P from the semiconductor laser is made to be smaller in the header region involving small quantity of returned light than that in the user data region in which a large quantity of light is returned. Although it is preferable that the quantity of the laser beam emitted by the semiconductor laser is the same between the header region and the user data region, there sometimes arises an excessive difference in the quantity of the emitted laser beam between the respective regions of the disk.

The power for the semiconductor laser has been controlled in such a manner that the CPU checks the quantity of the emitted laser beam at predetermined intervals to make the error from the desired quantity to be zero as described above. When the quantity of the laser beam obtained in the header region is checked, an erroneous discrimination can be made that the quantity of the emitted laser beam is too small although no error in the quantity of the emitted laser beam from a desired quantity has been detected in the operation of checking the quantity of the laser beam performed in the user data region. Thus, there arises a problem in that the quantity of the error is calculated.

Therefore, if the quantity of the electric current to be supplied to the semiconductor laser is changed in accordance with the quantity of the error, the quantity of the emitted laser beam is made larger than the desired value after the emitted laser beam has been moved to the user data region though a correct quantity of emission is obtained in the header region. Thus, there is a risk that information recorded by a user deteriorates due to the strong power beam.

On the contrary, a disk of a type in which the quantity of returned light in the header region is larger than that in the user data region encounters a risk that control of the power in accordance with the result of checking of the quantity of the laser beam performed in the header region causes the quantity of the emitted laser beam in the user data region to be smaller than the desired quantity and thus the C/N ratio deteriorates excessively to read the information.

A partially-embossed-type optical disk will now be considered as the optical recording medium of a mixed type in one disk in which are formed a track region having a recording and reproducing data region that enables information to be rewritten and a track region having a reproduction-only data region that stores information in the form of pits at the time of manufacturing the recording medium and that inhibits information to be rewritten. The partially-embossed-type optical disk involves difference in the quantity of light returned to the semiconductor laser between the two regions. Therefore, if the emission quantity is controlled to realize the desired quantity in each region, a problem arises in that the strong power beam deteriorates information recorded by the user or information cannot satisfactorily be read because the power is too small when the pickup is moved between the two regions.

OBJECTS AND SUMMARY OF THE INVENTION

An object of the present invention is to provide an optical information reproducing apparatus capable of controlling the emission quantity to produce optimum reproducing power in a rewritable user data region although light is returned from a recording medium thereof to the semiconductor laser.

Another object of the present invention is to provide an optical information reproducing apparatus capable of correctly controlling the emission quantity in a rewritable user data region and preventing deterioration of recorded data due to excessively large semiconductor laser power and erroneous reproduction of information due to lowering of the power.

Another object of the present invention is to provide an optical information reproducing apparatus which is capable of controlling the emission quantity to provide optimum reproducing power in a user data region that enables information to be recorded and reproduced even if light returns from the recording medium to the semiconductor laser in a case where an optical recording medium of a mixed type in one medium is used in which are formed a recording and reproducing track region that enables information to be rewritten and a reproduction-only track region storing information in the form of pits at the time of manufacturing the recording medium and inhibiting rewriting of information.

Another object of the present invention to provide an optical information reproducing apparatus capable of, in a case of use of an optical recording medium, in which a recording and reproducing track region that enables information to be rewritten and a reproduction-only track region having information in the form of pits and inhibiting rewriting of information are present in a mixed manner in one medium, preventing change in an electric current to be supplied to the semiconductor laser due to an influence of returned light caused from the presence and absence of pits when a pickup is moved between the two regions and preventing deterioration in the performance of the apparatus due to waiting time involved in the operation.

Another object of the present invention is to provide an optical information reproducing apparatus capable of accurately setting a desired quantity of a laser beam to be emitted by a semiconductor laser thereof even if each mounted medium involves dispersion of reflectance and/or molded pits by setting the desired quantity of the laser beam to be emitted for each of two regions consisting of a recording and reproducing track region that enables information to be rewritten and a reproduction-only track region having information in the form of pits while correcting the influence of returned light due to the presence and absence of the pits.

According to the present invention, there is provided an optical information reproducing apparatus for reproducing information from an optical recording medium that has a recording and reproducing and information-rewritable track region, which is composed of a header region having information, such as a sector start mark, track number and sector number, in a pit shape formed when said recording medium has been manufactured and a recording and reproducing user data region that has no pit and enables information to be recorded and reproduced, said optical information reproducing apparatus comprising: semiconductor laser output control means for controlling a quantity of a semiconductor laser beam to be emitted to a predetermined value such that a detected quantity of an emitted semiconductor laser beam is obtained in only the user data region when the quantity of the laser beam emitted by a semiconductor laser that irradiates the recording medium is detected.

Other and further objects, features and advantages of the invention will be appear more fully from the following description.

BRIEF DESCRIPTION OF THE DRAWINGS

FIGS. 3A and 3B are graphs showing output waveforms which illustrate the relationship between an emitted laser beam and light returned by a recording medium in a case where the high frequency superimposing operation is performed, in which FIG. 3A shows a case where no interference takes place between the emitted laser beam and returned light;

FIG. 3B shows a case where interference takes place between the emitted laser beam and returned light;

FIG. 4 is a graph showing the I-P characteristics of the semiconductor laser when the quantity of light returned to the semiconductor laser has been changed by using an apparatus for causing the emitted laser beam and returned light to interfere with each other;

FIGS. 6 to 9 illustrate a first embodiment of the present invention, in which

FIG. 6 is a block diagram which illustrates the structure of a semiconductor laser output control means of an optical information reproducing apparatus according to the first embodiment;

FIG. 7 is a diagram which illustrates the structure of a pickup portion;

FIG. 8 illustrates a first example of the operation of reading an output from an emission quantity detection portion plural times when the quantity of a laser beam to be emitted by the semiconductor laser is controlled;

FIG. 9 illustrates a second example of the operation of reading the output from the emission quantity detection portion plural times when the quantity of a laser beam to be emitted by the semiconductor laser is controlled;

FIGS. 10 to 13B illustrate a second embodiment of the present invention, in which FIG. 10 illustrates a schematic structure of each region on a recording surface of a partially-embossed-type optical disk for use in the apparatus according to the second embodiment;

FIG. 11 is a block diagram which illustrates the structure of a semiconductor laser output control means of the optical information reproducing apparatus according to the second embodiment;

FIG. 12 illustrates the operation for detecting the quantity of emitted laser beam when a track jumping operation is performed;

FIG. 13B illustrates the quantity of the laser beam emitted by the semiconductor laser in a track region A that enables only reproduction of information.

DETAILED DESCRIPTION OF THE PREFERRED EMBODIMENTS

FIGS. 6 to 9 illustrate a first embodiment of the present invention.

Figure 1:
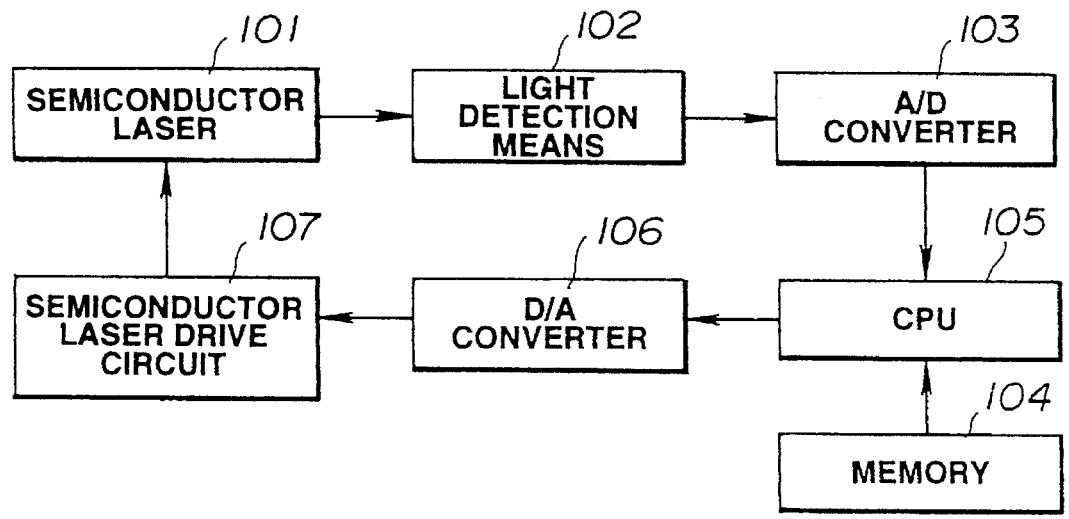
FIG. 1 is a block diagram which illustrates an example of the structure of a conventional semiconductor laser output control circuit.
Figure 2:
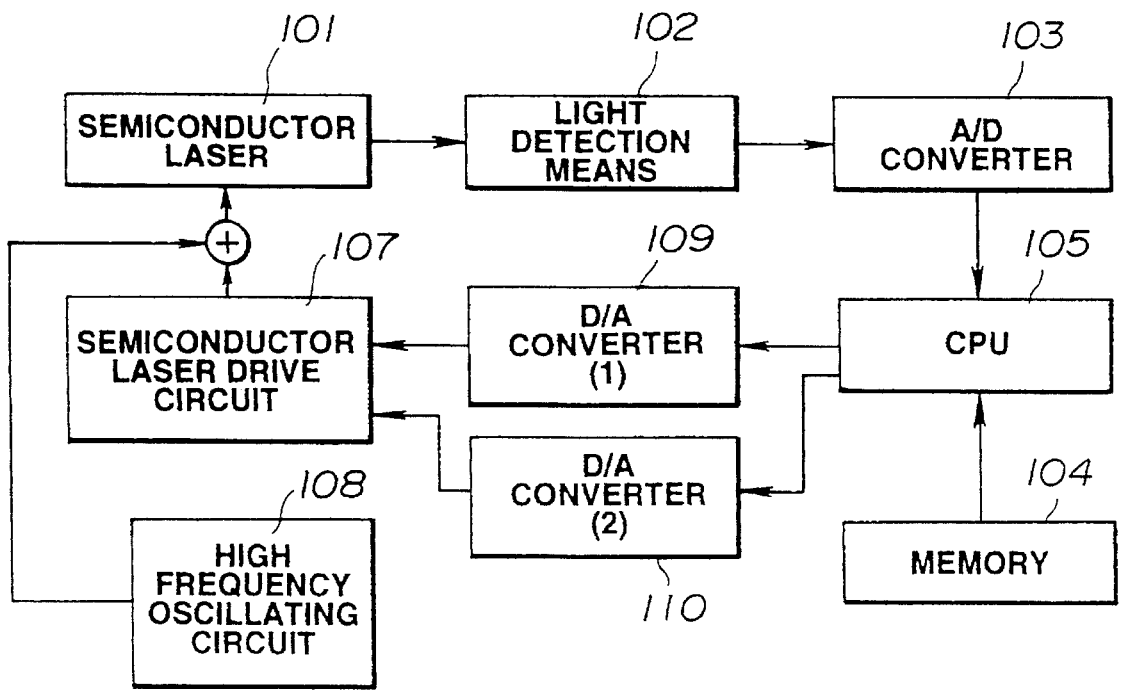
FIG. 2 is a block diagram which illustrates an example of the structure of a conventional semiconductor laser output control circuit having a structure for performing a high frequency superimposing operation.
Figure 5:
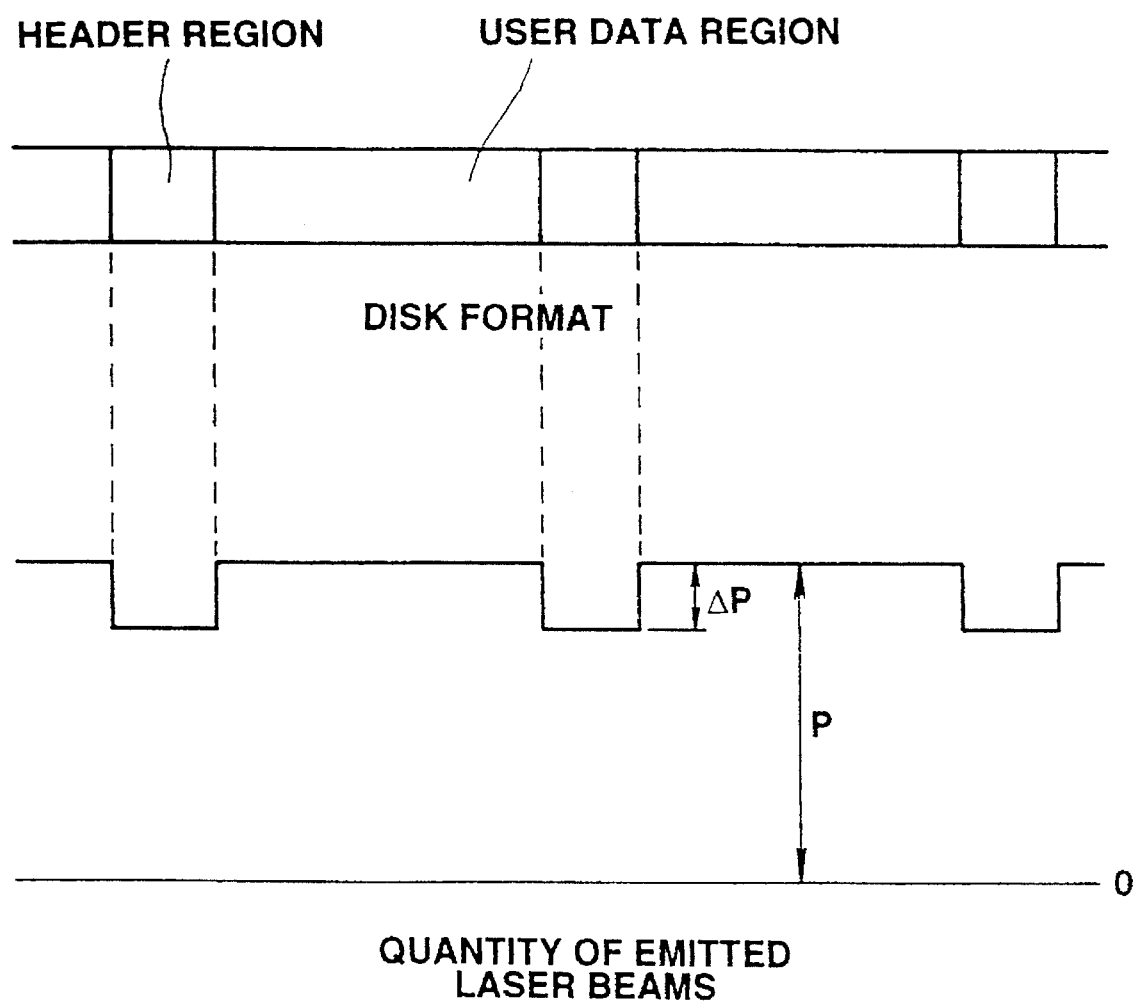
FIG. 5 is a characteristics graph showing an example of change in the laser beam emitted by the semiconductor laser in a reproduction-only header region of the disk having information in the form of pits and a user data region of the disk having no pit and enabling information to be recorded and reproduced.
Figure 6:
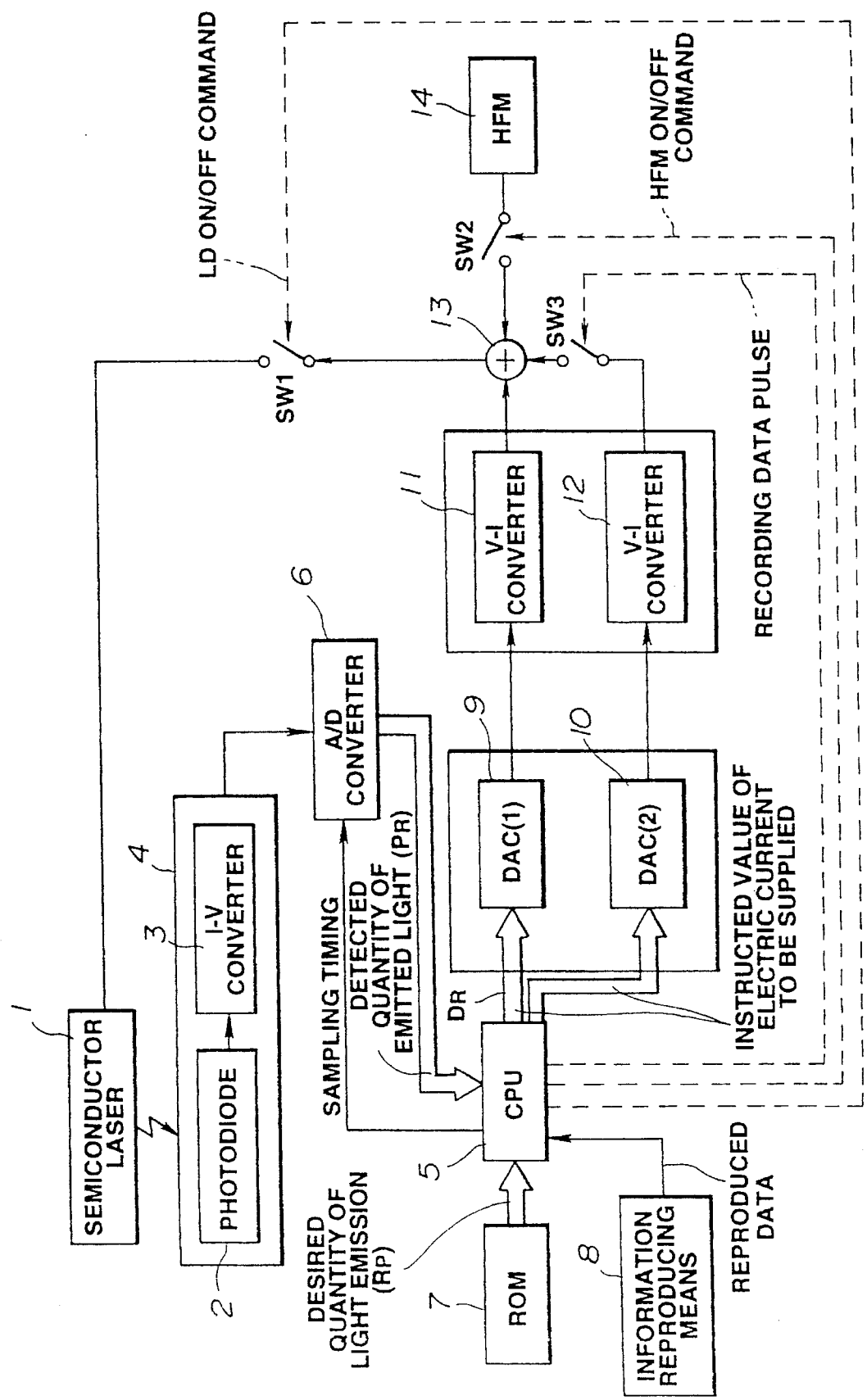

An optical information reproducing apparatus according to this embodiment has a pickup portion that comprises: a semiconductor laser (also called an "LD") 1 for emitting laser beams; and a light detection means 4 including a photodiode 2 for receiving a portion of the laser beams emitted by the semiconductor laser 1 and an I-V converter 3 for converting an output electric current from the photodiode 2 into voltage. As a semiconductor laser output control means for controlling the quantity of a laser beam emitted by the semiconductor laser 1, the optical information reproducing apparatus comprises a circuit having a structure as shown in FIG. 6.

The semiconductor laser output control means has a CPU 5 for controlling each portion. The following units are connected to the CPU 5: an A/D converter 6 for converting an output from the I-V converter 3 into a digital signal; a ROM 7 storing predetermined quantities of laser beams to be emitted at the time of reproducing, deleting and recording information as desired quantities of the emitted laser beams; and an information reproducing means 8 for reproducing, in accordance with a reproduction signal obtained from light reflected by the recording medium, information recorded on a recording medium.

The optical information reproducing apparatus further comprises: a D/A converter (also abbreviated to a "DAC") (1) 9 for converting an instruction value, which corresponds to the quantity of the laser beam (also called "read power") to be emitted at the time of reproducing information, into an analog voltage value; and a V-I converter 11 serving as a semiconductor laser drive means that converts the output voltage from the DAC (1) 9 into an electric current to supply the electric current to the semiconductor laser 1. Thus, the output electric current from the V-I converter 11 is supplied to an adder circuit 13. Furthermore, the optical information reproducing apparatus has a D/A converter (DAC) (2) 10 for converting an instruction value with which the quantity of the laser beam (also called "peak power") to be emitted at the time of recording information is obtained and transmitted from the CPU 5 into an analog voltage value, and a V-I converter 12 for converting output voltage from the DAC (2) 10 into an electric current. The output electric current from the DAC (2) 10 is supplied to the adder circuit 13 through a switch SW3. The switch SW3 is controlled by the CPU 5 so as to be switched on and off in response to a modulation signal (a recording data pulse) of information to be recorded.

In addition, a high frequency oscillation circuit (also called a "HFM") 14 for generating a high frequency electric current is provided. Thus, a high frequency electric current output from the high frequency oscillation circuit 14 is, through a switch SW2, supplied to the adder circuit 13 which serves as a high frequency superimposing means. An output terminal of the adder circuit 13 is, through a switch SW1, connected to the semiconductor laser 1 so that the electric current superimposed by the adder circuit 13 is, as a drive electric current, supplied to the semiconductor laser 1.

Figure 7:
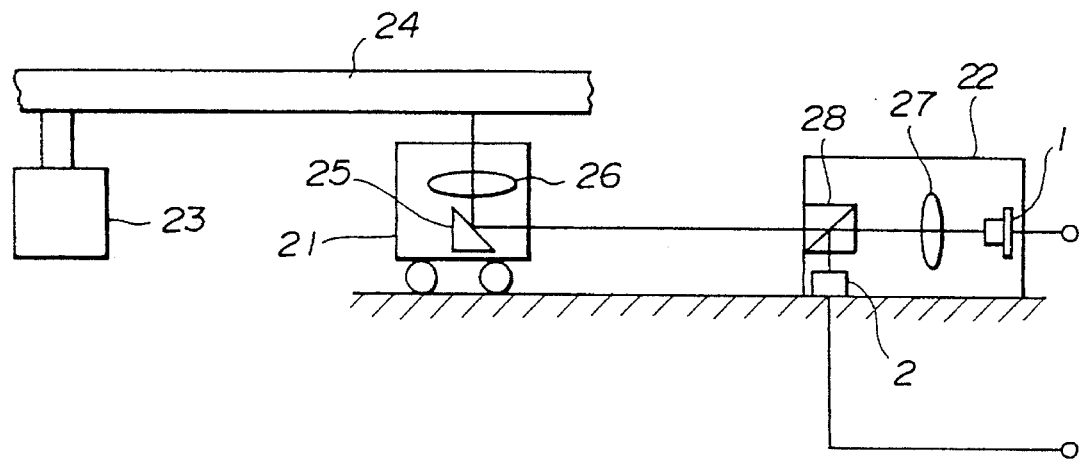

The structure of a pickup portion including the semiconductor laser 1 is shown in FIG. 7. The pickup portion is so-called a separation optical type pickup having a movable portion 21 and a fixed portion 22. The movable portion 21 is disposed to face a disk 24 that is rotated by a spindle motor 23 in such a manner that the movable portion 21 is able to move in the radial direction of the disk 24. The movable portion 21 has a total reflection prism 25 for causing the laser beams to run toward the disk 24, an objective lens 26 for converging the laser beams on the disk 24 and a tracking and focusing actuator (not shown). The fixed portion 22 has the foregoing semiconductor laser 1, the photodiode 2, a collimator lens 27 for causing laser beams emitted by the semiconductor laser 1 to be parallel beams and a beam splitter 28 for transmitting and reflecting laser beams emitted by the laser beams to separate the flux.

In the pickup portion having the foregoing structure, the semiconductor laser 1 emits laser beams, and a desired track on the disk 24 is, by moving the movable portion 21, irradiated with a beam spot formed by converging the laser beams by the objective lens 26 and so forth. Thus, information can be recorded and reproduced.

The operation of the semiconductor laser output control means according to this embodiment will now be described.

When information is reproduced, the CPU 5 switches on the switch SW1 to enable the semiconductor laser 1 to be turned on. Furthermore, an instructed value of the electric current to be supplied (a desired quantity of the laser beam to be emitted) that corresponds to the quantity of the semiconductor laser beam to be emitted at the time of reproducing information is read from the ROM 7 so as to be supplied to the DAC (1) 9. Then, the output voltage from the DAC (1) 9 is converted into an electric current by the V-I converter 11 so that the electric current is, as a drive electric current, supplied to the semiconductor laser 1. In order to superimpose a high frequency electric current, the switch SW2 is switched on at this time so as to supply a high frequency electric current to the semiconductor laser 1. Then, a laser beam emitted by the semiconductor laser 1 is detected by the photodiode 2 so that a detected quantity of the emitted laser beam is obtained through the I-V converter 3 and the A/D converter 6 so as to be supplied to the CPU 5. The CPU 5 calculates an error between the actual quantity of the emitted semiconductor laser beam obtained from the detected quantity of the emitted semiconductor laser beam and the desired quantity of the semiconductor laser beam that has been read from the ROM 7. The CPU 5 changes the output voltage from the DAC (1) 9 in such a manner that the calculated error is made to be zero. Thus, the CPU 5 controls the quantity of the laser beam emitted by the semiconductor laser 1 to obtain a predetermined read power.

When information is recorded, the CPU 5 reads, from the ROM 7, an instructed value of the electric current to be supplied for obtaining the quantity of the semiconductor laser beam (the peak value) to be emitted at the time of recording information to supply the read instructed value to the DAC (2) 10. The output voltage from the DAC (2) 10 is converted into an electric current by the V-I converter 12 so as to be supplied to the adder circuit 13 through the switch SW3. In response to the modulation signal (the recording data pulse) of information to be recorded, the CPU 5 switches on and off the switch SW3 for the output from the V-I converter 12 to cause the semiconductor laser 1 to emit the laser beams in such a manner that the intensity of the laser beams is changed between a predetermined peak power and a predetermined bottom power in accordance with data to be recorded.

In this embodiment, description is made in detail about only the control of the quantity of the laser beam to be emitted at the time of reproducing information.

In a first step, the pickup is moved to perform the initial setting. The pickup is moved to establish the initial setting such that the movable portion 21 of the pickup portion is moved to a position at which a portion irradiated with the beam spot emitted from the moved pickup portion is positioned on the outside of the user data region of the disk 24, for example, the movable portion 21 is moved to the innermost portion in which no track is present in a case of an ISO standard disk.

In a second step, the instructed value of the output (the instructed value of the electric current to be supplied) from the DAC (1) 9 for reproducing information is obtained.

In the second step, the DAC (1) 9 and the DAC (2) 10 are reset to make their outputs to be zero, and then the switch SW1 is switched on to establish the connection between the semiconductor laser 1 and the V-I converter 11 to supply the output electric current from the V-I converter 11 to the semiconductor laser 1. Then, the switch SW2 is switched on so as to supply the high frequency electric current, which is the output from the high frequency oscillating circuit 14, to the semiconductor laser 1.

Then, the CPU 5 reads, from the ROM 7, the semiconductor laser beam quantity (RP) to be emitted at the time of reproducing information to transfer corresponding bit data DR to the DAC (1) 9 for setting the read power. As a result, the output voltage from the DAC (1) 9 is converted into an electric current by the V-I converter 11 so that it is supplied to the semiconductor laser 1 as a drive current.

The CPU 5 reads the detected quantity of the emitted laser beam (PR1), which is the output from the A/D converter 6 to calculate PR1–RP which is the error between the actual quantity of the emitted semiconductor laser beam and the desired quantity of the semiconductor laser beam. If the error is larger than zero, the instructed value of output from the DAC (1) 9 is reduced. If the error is smaller than zero, the instructed value of the output from the DAC (1) 9 is enlarged. Since the electric current to be supplied to the semiconductor laser 1 is changed in accordance with the change in the instructed value of the output from the DAC (1) 9, the quantity of the semiconductor laser beam to be emitted is changed.

The, the CPU 5 again reads the output (PR2) from the A/D converter 6 to calculate an error PR2–RP. If the error is zero, setting of the instructed value of the output from the DAC (1) 9 is completed, the setting being intended to change the electric current to be supplied in accordance with the characteristics of the semiconductor laser for causing the semiconductor laser 1 to emit a laser beam with predetermined power (the read power) for reproducing information. If the error is not zero, the instructed value of the output from the DAC (1) 9 is changed until the error is converged to zero.

In a third step, the instructed value of the output from the DAC (1) 9 is updated in order to cause the semiconductor laser to emit the laser beam in a quantity required to reproduce information.

In the third step, the focusing-directional actuator (not shown) is controlled after setting of the DAC (1) 9 has been completed to perform an automatic focusing operation so that focusing servo operation is performed. Then, the movable portion 21 of the pickup portion is moved inwards of the disk 24 until a track error signal can be detected. At the position of the detection, a tracking servo operation is performed. That is, the instructed value of the output from the DAC (1) 9 is updated similarly to the above in a state where the focusing servo and tracking servo operations are performed.

In a fourth step, the instructed value of the output from the DAC (1) 9 for reproducing information is updated in a state where returned light is present.

In the fourth step, the CPU 5 detects, after the tracking servo operation has been performed, the sector mark in the leading portion of the sector from the reproduced data which is the output from the information reproducing means 8. The CPU 5 stops monitoring of the output from the A/D converter 6 until the sector mark is detected. When the sector mark has been recognized, a time in which the reproducing beam spot is positioned in a region from the leading portion of the sector to the header region is calculated in accordance with the format of the mounted disk. During the time, stopping of monitoring of the output from the A/D converter 5 is continued.

After the sector mark has been recognized, the CPU 5 continuously reads reproduced data supplied from the information reproducing means 8 to recognize ID information from the reproduced data. When the ID information has been recognized, the time, in which the beam spot is moved from the position at which the ID information has been recorded to the start point of the user data region which is the information recording and reproducing region (a land portion), can be calculated in accordance with the format of the mounted disk. The CPU 5 waits for the beam spot to be brought to the start point of the user data region for a predetermined time after the ID information has been reproduced. Then, it transmits a sampling timing signal to the A/D converter 6 to read detected quantity (PR3) of the emitted laser beam which is the output from the A/D converter 6. Since the time in which the output from the A/D converter is set in accordance with the format of the disk 24, the quantity of the emitted semiconductor laser beam in the user data region can be detected while assuredly avoiding the header region.

If the ID information cannot be read within a predetermined time after the sector mark has been recognized, it can be considered that it has been due to erroneous detection of the sector mark caused from noise or the like of the user data region though the detected region was not the header region or that the ID portion has a defect although the sector mark has been detected. After the sector mark has been recognized, the beam spot is therefore positioned in the user data region from a moment the calculated time in which the beam spot is positioned in the header region has passed to a moment the next sector mark is recognized. Thus, the CPU 5 suspends the stop of monitoring of the output from the A/D converter 6 in the foregoing period and reads a detected quantity (PR3) of the emitted laser beam, which is the output from the A/D converter 6.

When the next sector mark has been detected, the operation returns to the initial stage of the fourth step. Note that another arrangement may be employed in which the CPU 5 does not recognize the ID information but it recognizes only the sector mark; and the CPU 5 reads the output from the A/D converter 6 from a moment the predetermined time, in which the beam spot is positioned in the header region after the sector mark has been recognized, has passed to a moment the next sector mark is recognized.

Description will be made about the operation in a case where the CPU 5 cannot recognize the sector mark from the reproduced data within a predetermined time after the tracking servo operation has been performed. If the CPU 5 cannot recognize the sector mark within the predetermined time, the CPU 5 transmits a sampling timing signal to the A/D converter 5 to read the output from the A/D converter 5 plural times at predetermined intervals.

Figure 8:
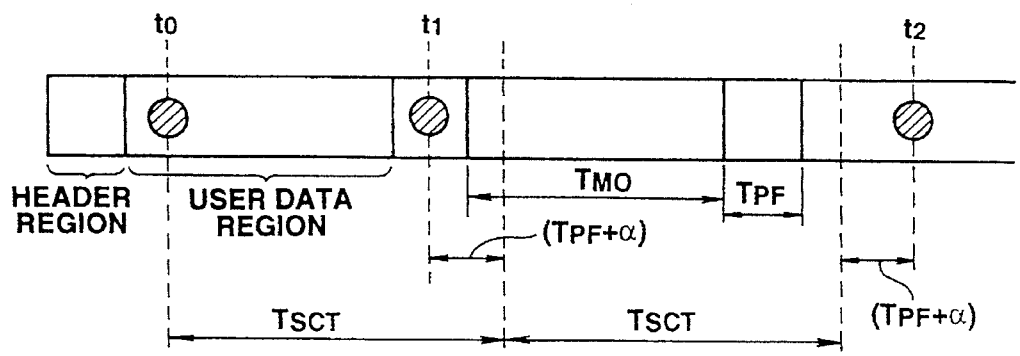

FIG. 8 illustrates a first example of the operation to be performed in the case where the output from the A/D converter 5 is read plural times, where the output is read three times here. Referring to FIG. 8, circles with diagonal lines indicate the positions of the beam spots at each timing at which the output from the A/D converter 5 is read.

Assuming that the timing at which the output from the A/D converter 5 is first read is t0, the CPU 5 reads the output data from the A/D converter 6 after time t1 has passed from t0 at the second time, and reads the same after time t2 has passed from time t0 at the third time, t1 and t2 being obtainable from the following equations (1) and (2), respectively:

$$t_1 = T_{SCT} \times N - T_X \quad (1)$$

$$t_2 = T_{SCT} \times M - T_X \quad (2)$$

where N is an integer not less than 1, M is an integer not less than 2 and $T_{SCT}$ is a period in which the beam spot moves in one sector.

Note that Tx may be arbitrarily selected if the following condition expressed by equation (3) is satisfied:

$$T_{PF} < T_X < T_{MO} \quad (3)$$

where $T_{PF}$ is a period in which the header region is irradiated with the beam spot, $T_{MO}$ is a period in which the user data region is irradiated with the beam spot, and $T_{SCT}$ in equations (1) and (2) satisfies the relationship $T_{SCT} = T_{PF} + T_{MO}$.

If N=1, M=2 and Tx=$T_{PF}+\alpha$ ($\alpha$ is a predetermined value determined while considering the deviation of the rotation) as shown in FIG. 8, $t_1 = T_{SCT} - (T_{PF}+\alpha)$ $t_2 = 2 \cdot T_{SCT} + (T_{PF}+\alpha)$. At the second time, the CPU 5 transmits the sampling timing signal after $T_{SCT}-(T_{PF}+\alpha)$ has passed from time t0. At the third time, the CPU 5 transmits the same after $2 \cdot T_{SCT}+(T_{PF}+\alpha)$ has passed from time t0. Thus, the CPU 5 reads the output data from the A/D converter 6.

Although there is a possibility that at least one of the three times of the operations of reading the output data from the A/D converter 6 is reading the output data in the period in which the header region is irradiated with the beam spot, the residual two times are the operations that assuredly detect the emitted semiconductor laser beam quantity in the user data region. Therefore, the CPU 5 compares data read in the three times of the reading operation. The smallest value among the three data items that are estimated to be read in the header region is omitted and the residual two data items are averaged and made to be output data PR3 from the A/D converter 5, the header region being a region in which the quantity of returned light is smaller than that in the user data region and therefore the quantity of the emitted semiconductor laser beam is small correspondingly.

That is, by reading the output data from the A/D converter 5 at the timing before and after the initial timing, at which the output data from the A/D converter has been read, by the time in which the beam spot is moved in the header region and which is a portion of the time in which the beam spot is moved in one sector, the quantity of the semiconductor laser beam emitted toward the user data region can be detected assuredly two of the three times.

Although there is a possibility that all three times of the reading operations have read the values in the user data region, the smallest value is, in this case, omitted and the average of the residual two data items is calculated.

Figure 9:
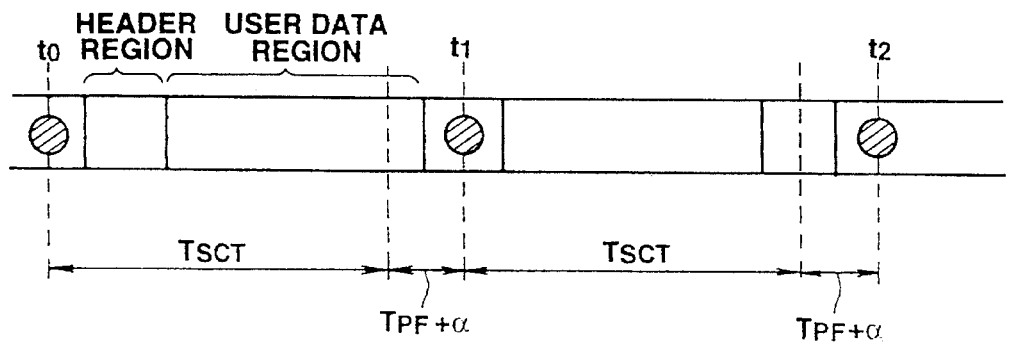

FIG. 9 illustrates a second example of the operation for reading the output from the A/D converter 5 plural times, in which the same is read three times in this example. Referring to FIG. 9, circles with diagonal lines indicate the positions of the beam spots at each timing at which the output from the A/D converter 5 is read.

Assuming that the timing at which the output from the A/D converter 5 is first read is t0, the CPU 5 reads the output data from the A/D converter 6 after time t1 has passed from time t0 at the second time, time t1 being obtainable from the following equation (4):

$$t_1 = T_{SCT} \times A + T_X \quad (1)$$

where A $\geq$ 0, A is a plus integer or a fraction of an integer (assuming that N is an integer not less than 1, A=0, N, 1/N) and Tx can be arbitrarily selected if the condition expressed in equation (3) is satisfied).

If A=1 and Tx=$T_{PF}+\alpha$ ($\alpha$ is a predetermined value determined while considering the deviation of the rotation) as shown in FIG. 9, $t_1 = T_{SCT}+T_{PF}+\alpha$. At the second time, the CPU 5 transmits the sampling timing signal after $T_{SCT}+T_{PF}+\alpha$ has passed from time t0. At the third time, the CPU 5 transmits the same after time $T_{SCT}+T_{PF}+\alpha$ has passed from the second timing, followed by ensuing times performed similarly. Thus, the CPU 5 reads the output data from the A/D converter 6.

Since the ratio of the length of the header region (53 bytes) and that of the user data region (672 bytes) standardized by ISO is about 1:12, the timing at which the output from the A/D converter 5 is, at each reading operation, deviated by a degree corresponding to the length of the header region as the relative position in the sector in a case where an ISO standard disk is used, followed by substantially returning to the original position at the thirteenth time. If the output data from the A/D converter 6 is read 12 times or less, there is a possibility that the same can be, one of twelve times, read in a period in which the header region is irradiated with the beam spot. However, the emitted semiconductor laser beam quantity in the user data region can be detected assuredly in the residual reading operations (at this time, data is read in a period of 12 sectors in the case where A=1 in equation (4) such that data is read one time in a period of one sector and the same is read in a period of 6 sectors in the case where A=½ such that data is read two times in a period of one sector). Therefore, the CPU 5 omits the smallest one among the read data items and averages the other values to make the average value output data PR3 from the A/D converter 5.

That is, the output data from the A/D converter 5 is read at the timing relatively deviated by a degree of the sector corresponding to the time in which the beam spot is positioned in the header region from the timing at which the output data from the A/D converter 5 has been read initially. Thus, the reading operations are made to be lesser than the times (12 times or less if 1:12) that corresponds to the ratio of the length of the header region and that of the user data region so that the emitted semiconductor laser beam quantity in the user data region can be detected assuredly at the residual times except the one time.

Any of the three methods, that is, the method to be employed in the case where the sector mark has been recognized from the reproduced data and the two methods to be respectively employed in the case where the sector mark could not be recognized is used to obtain the detected quantity (PR3) of the emitted laser beam which is the output from the A/D converter 6. Then, the CPU 5 compares the detected quantity of the emitted laser beam and the desired quantity of the semiconductor laser beam obtained from the ROM 7 so as to obtain the error. That is, the CPU 5 calculates TR3–RP which is the error between the emitted semiconductor laser beam quantity read from the output data from the A/D converter 6 and the desired quantity of the semiconductor laser beam.

If an error has been detected, the instructed value of the electric current to be supplied to the DAC (1) 9 is changed to make the emitted semiconductor laser beam quantity to be the desired quantity of the semiconductor laser beam. Any of the foregoing three methods is employed to read the detected quantity of the emitted laser beam which is the output from the A/D converter 6 so as to update the instructed value to be supplied to the DAC (1) 9 until the error is converged to zero.

Then, the change in the characteristics of the semiconductor laser occurring due to change in the ambient temperature or the like that causes generation of an error between the emitted semiconductor laser beam quantity and the desired quantity of the semiconductor laser beam is prevented by the repetitive operations of updating the instructed output value to be supplied to the DAC (1) 9 performed, in the fourth step, by the CPU 5 at predetermined time intervals until the power supply to the apparatus is turned off.

If the emitted semiconductor laser beam quantity is controlled in the user data region, the emitted semiconductor laser beam quantity is sometimes reduced in the header region. However, information is reproduced in the header region by using intensities of returned light while being different from the user data region in which the Kerr effect is used to reproduce a weak signal. Therefore, information can be reproduced with excellent C/N ratio although the emitted semiconductor laser beam quantity has been reduced. Since the information pits do not deteriorate in the header region, a great reading margin can be provided so that any problem is not raised even if the quantity of the laser beams has been somewhat changed.

As described above, the control of the emitted semiconductor laser beam quantity is, in this embodiment, performed such that the detection of the emitted semiconductor laser beam quantity is not performed in the header region but the same is always performed in the user data region for recording and reproducing user information. Therefore, even if light is returned from the recording medium, the amount of the error between the detected quantity of the emitted laser beam and the optimum emitted semiconductor laser beam quantity in the user data region at the time of reproducing information can be detected accurately. Thus, the emitted semiconductor laser beam quantity in the user data region can be controlled accurately, the user data region being the region in which the semiconductor laser must be accurately emitted with predetermined power. As a result, the erroneous calculation can be prevented, the calculation being performed to obtain the error from the desired reproducing power and causing the power of the semiconductor laser to be set to an excessively high level. Thus, deterioration in the recorded data can be prevented. In addition, excessively low setting of the power that lowers the signal level and causes erroneous reproduction of information can be prevented.

The quantity of semiconductor laser beam to be emitted is controlled such that: the quantity of the emitted semiconductor laser beam is detected plural times at the time intervals that do not cause the two or more times of detection operations to be performed in the header region; specific data considered to be detected in the header region is omitted from the detected data; an average value of the residual data is obtained; and the average value is made to be the result of monitoring the quantity of the semiconductor laser beam to be emitted; the quantity of error between the result and a desired reproducing power is obtained so that the quantity of the semiconductor laser beam to be emitted is controlled. As a result, even if the information reproducing means is not operated normally, the output from the information reproducing means is used so that the error in the quantity of the emitted semiconductor laser beam can be always detected similarly to the case where the quantity of the semiconductor laser beam to be emitted is monitored in the user data region. Therefore, the quantity of the semiconductor laser beam to be emitted can be controlled accurately.

This embodiment can be applied to also a case where a medium, the user data recording and reproducing region of which uses the groove portion in place of the land portion.

As described above, according to this embodiment, even if light returned from a recording medium to the semiconductor laser is present, the quantity of the semiconductor laser beam to be emitted can be controlled correctly to cause the reproducing power to be optimum in the user data region. Thus, an effect can be obtained in that the following problems can be prevented: the power of the semiconductor laser is enlarged excessively and thus recorded data deteriorates; and the power is lowered excessively that causes information to be reproduced erroneously.

An embodiment of controlling the quantity of the semiconductor laser beam to be emitted in an optical information reproducing apparatus will now be described. This embodiment is adaptable to a case where information is reproduced from a partially-embossed-type optical recording medium that comprises an information-rewritable recording and reproducing data region and a reproduction-only data region on which information is, in the form of pits, formed at the time of manufacturing the recording medium and which inhibits rewriting of the information, the two regions being present in one medium in a mixed manner.

Figure 10:
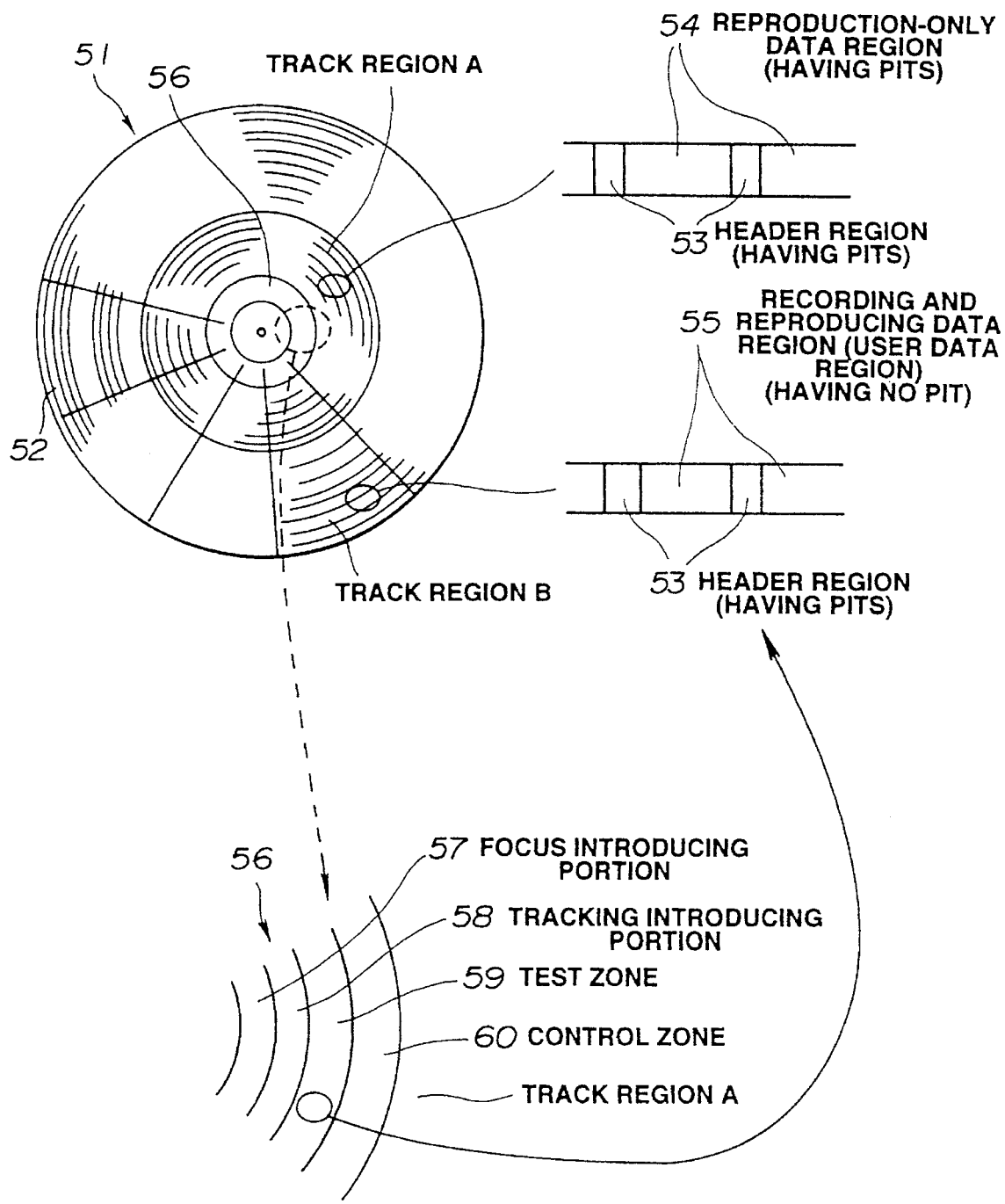

FIG. 10 illustrates a schematic structural example of each region on the recording surface of the partially-embossed-type optical disk.

A partially-embossed-type optical disk 51 has a plurality of tracks 52 on a recording surface thereof, thus the optical disk 51 being divided into a predetermined number of tracks. The optical disk 51 has a track region (hereinafter called a "track region A" only for reproducing information, the track region A having a reproduction-only data region on which information is recorded in the form of pits and which permits only reproduction of information. Furthermore, the optical disk 51 has a track region (hereinafter called a "track region B") for recording and reproducing information, the track region B having a recording and reproducing data region which enables information to be recorded and reproduced by a photomagnetic method or the like.

The track region A has a header region 53 in the leading portion of each sector on the track, the header region 53 having information such as a sector start mark, a track number, a sector number in the form of pits formed at the time of manufacturing the disk. In the rear of the header region 53, a reproduction-only data region 54 is formed which has recorded information in the form of pits similarly to the header region 53 and which enables only reproduction of information. The track region B has a header region 53 in the leading portion of each sector on the track, the header region 53 having information in the form of pits similarly to the track region A. In the rear of the header region 53, a recording and reproducing data region (corresponding to the user data region according to the first embodiment) having no pits and enabling information to be recorded (rewritten) and reproduced by the photomagnetic method or the like.

In a case where the control of the quantity of the semiconductor laser beam to be emitted according to the first embodiment is applied to an apparatus comprising the foregoing partially-embossed-type optical disk, the track region B which enables information to be recorded and reproduced is subjected to the detection operation in which the quantity of the emitted semiconductor laser beam is detected in only the user data region having no pit or the detection operation in which the data of the quantity of the emitted semiconductor laser beam that is considered to be detected in the header region having pits is omitted and the quantity of the semiconductor laser beam emitted in the user data region is calculated. Thus, the control of maintaining the quantity of the semiconductor laser beam to be emitted in the user data region at a predetermined value can be performed accurately. As a result, the quantity of the semiconductor laser beam to be emitted in the user data region can be accurately and optimally controlled, the user data region being a region in which the quantity of the semiconductor laser beam to be emitted must be controlled precisely. Therefore, deterioration in data and erroneous reproduction can be prevented.

The track region A, which enables only reproduction of information, has pits formed continuously in the reproduction-only data region which is formed in the rear of the header region, as well as the header region. Therefore, the track region A has not the user data region which has no pit and in which the quantity of the emitted semiconductor laser beam is detected for the purpose of controlling the quantity of the semiconductor laser beam to be emitted. Therefore, the detection of the quantity of the emitted semiconductor laser beam in the user data region having no pit cannot be performed at least in a period in which the track region A for enabling only the reproduction of information is irradiated with laser beam. Therefore, the control of the quantity of the semiconductor laser beam to be emitted cannot be performed in the track region A, the control being enabled in the track region B.

If updating of the quantity of the drive electric current to be supplied to the semiconductor laser is inhibited while maintaining the stoppage of the operation for detecting the quantity of the emitted semiconductor laser beam, change in the temperature in the apparatus will change the characteristics of the semiconductor laser, and change the quantity of the emitted laser beam with respect to the drive electric current. Thus, the power for emitting the laser beam cannot be maintained at a predetermined value. Therefore, even if the track region A, which enables only reproduction of information, is being irradiated with a laser beam, the quantity of the detected semiconductor laser beam must be detected at every predetermined time and the electric current to be supplied to the semiconductor laser must be changed to make the error from the desired quantity of the laser beam to be zero.

However, if the quantity of the emitted semiconductor laser beam is detected in the reproduction-only track region A similarly to the recording and reproducing track region B such that the only the header region is avoided, the difference in the quantity of light returned to the semiconductor laser between the reproduction-only data region in the track region A and the user data region formed in the track region B and having no pit results in that a quantity of the emitted semiconductor laser beam is detected which is different from the quantity of the emitted semiconductor laser beam in the user data region. Therefore, when the quantity of the emitted semiconductor laser beam is detected to control the quantity of the semiconductor laser beam to be emitted, the detection of the quantity of the emitted semiconductor laser beam in the reproduction-only data region, in which information is formed in the pits and the diffraction reduces the quantity of returned light, results in a discrimination to be made such that the quantity of the emitted laser bean is insufficient though the quantity of the emitted semiconductor laser beam is detected in the user data region having no pit and the drive electric current is adjusted to eliminate an error from the desired quantity of the semiconductor laser beam.

In this case, the quantity of the electric current to be supplied to the semiconductor laser in accordance with the foregoing discrimination is enlarged in a period in which the pickup is positioned in the reproduction-only track region A and the track of the track region A is continuously irradiated with the laser beam emitted from the semiconductor laser. Thus, the quantity of the semiconductor laser beam to be emitted is controlled in the track region A in such a manner that the error from the desired quantity of the laser beam to be emitted is made to be zero. However, if the pickup is moved from the track region A to the recording and reproducing track region B after the quantity of the electric current to be supplied to the semiconductor laser has been enlarged, the laser beam emitted from the semiconductor laser with the quantity of the electric current after the foregoing change in the electric current can be applied, in an optimum quantity, to the header region having no pit similarly to the track region A. However, the quantity of the returned light is, by a degree corresponding to the omission of diffraction, enlarged in the user data region in the form of the land. Thus, the quantity of the semiconductor laser beam to be emitted is made larger than the desired value. Therefore, there is a fear that the strong-power beam deteriorates information recorded by a user.

In a contrary case of a disk of a type in which the quantity of returned light is larger in the region having pits than that in the user data region, the detection of the quantity of the semiconductor laser beam to be emitted, which is performed in the reproduction-only track region A, causes a discrimination to be made that the detected value is larger than the desired quantity of the laser beam to be emitted. Thus, the quantity of the semiconductor laser beam to be emitted is controlled in such a manner that the quantity of the electric current to be supplied to the semiconductor laser is reduced. If the pickup is then moved to the reproduction-only track region B, the laser beam emitted from the semiconductor laser with the changed quantity of the drive electric current is, in the user data region, made to be lower than a desired quantity of the laser beam to be emitted. Thus, there arises a fear that the C/N ratio deteriorates and thus information cannot be read.

If the quantity of the emitted semiconductor laser beam in the reproduction-only track region A is detected to adjust the quantity of the electric current to be supplied, control must be performed in such a manner that the pickup is moved to the reproduction-only track region B and then the changed quantity of the electric current to be supplied to the semiconductor laser is returned and modified to an adequate value in the user data region in the track region B to cause the laser beam to be emitted in an optimum quantity. The foregoing control takes a predetermined time and causes the recording operation to be inhibited and waited for during the period in which the power of the semiconductor laser is being modified. Therefore, the forged waiting time arises a problem in that the transfer rate is lowered and the performance of the apparatus deteriorates.

If the quantity of the emitted semiconductor laser beam is detected in the reproduction-only track region A to control the quantity of the semiconductor laser beam to be emitted, the foregoing problem arises. Therefore, it might be considered feasible to employ a method in which: the detection of the quantity of the emitted semiconductor laser beam is inhibited during the period in which the tracks in the track region A is irradiated with the laser beam; the change in the temperature in the apparatus is previously monitored; the pickup is moved to the recording and reproducing track region B if change in the temperature by a degree larger than a predetermined value has been detected or if a time longer than a predetermined time has passed; and the quantity of the emitted semiconductor laser beam is detected in the user data region, so that the quantity of the semiconductor laser beam to be emitted is controlled. In this case, the semiconductor laser power cannot be inadequate power in the user data region even immediate after the pickup has been moved from the track region A to the track region B.

However, control of the foregoing type involves a necessity of performing an operation for moving the pickup between the reproduction-only track region A and the recording and reproducing track region B. The foregoing operation additionally necessitates a predetermined waiting time that is needless originally. Also the transfer rate can be lowered, thus causing a problem to arise in that the operation of the apparatus deteriorates.

A structure capable of overcoming the foregoing problem involved in a case where the partially-embossed-type optical recording medium is reproduced will now be described as a second embodiment of the present invention with reference to FIGS. 11 to 13B.

Figure 11:
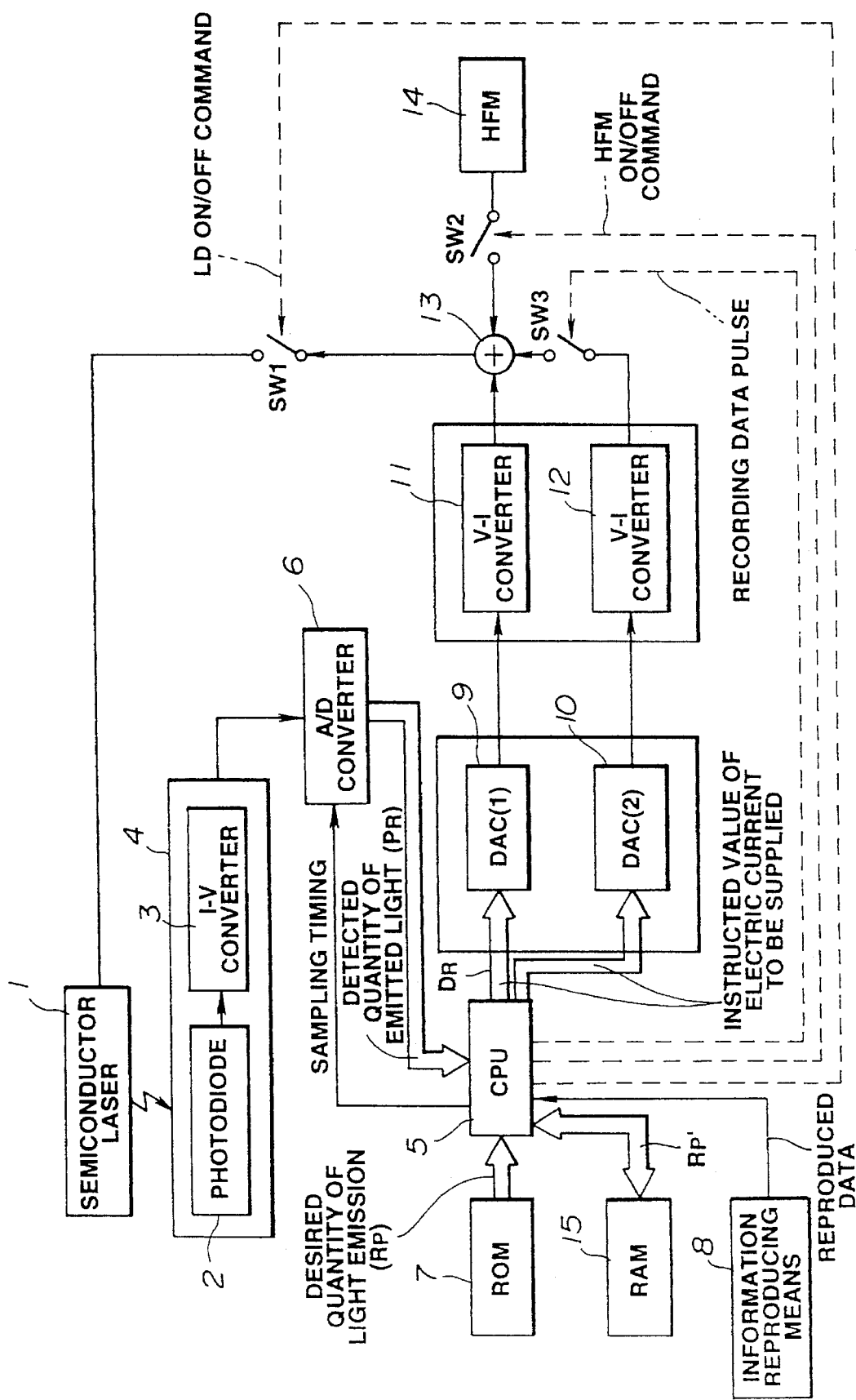

As shown in FIG. 11, the semiconductor laser output control means of the optical information reproducing apparatus according to the second embodiment comprises, in addition to the structure according to the first embodiment, a RAM 15 for storing a desired quantity of a laser beam to be emitted in the data region which enables only reproduction of information that is required in an operation to be described later. The other structures are similar to those of the first embodiment shown in FIG. 6 and they are omitted from description.

A partially-embossed-type optical disk 51 serving as a recording medium for use in the optical information reproducing apparatus according to this embodiment comprises: a track region A having a reproduction-only data region 54 containing information in the form of pits as shown in FIG. 10 and enabling only reproduction of information; and a track region B having a recording and reproducing data region 55 enabling both recording and reproducing of information. The reproduction-only track region A and the recording and reproducing track region B have the recording surfaces that have the same reflectance.

An inner portion 56 on the inside of the reproduction-only track region A, when viewed from the inside and as shown in the lower side of FIG. 10, comprises: a focus introducing portion 57 composed of a mirror portion (a mirror zone) which is a total reflection region for introducing focus servo for performing focus control; a tracking introducing portion 58 having a plurality of tracks for introducing tracking servo for performing tracking control; a test zone 59 having a plurality of tracks each having a format similar to the information rewritable track region B; and a control zone 60 having information, such as the type of the disk, the format and so forth, recorded in the form of pits.

The operation of the semiconductor laser output control means according to this embodiment will now be described. Since the basic operations to be performed at the time of reproducing information and recording information are similar to those according to the first embodiment, they are omitted from description. Therefore, only the control of the quantity of the semiconductor laser beam to be emitted at the time of reproducing information will now be described.

In a first step, the pickup is moved to perform the initial setting. The pickup is moved to establish the initial setting such that the movable portion 21 of the pickup portion is moved to a position at which a portion irradiated with the beam spot emitted from the moved pickup portion is outside the user data region of the disk 51, for example, the movable portion 21 is moved to the innermost portion in which no track is present in a case of an ISO standard disk (which is the focus introducing portion 57 in the case of the partially-embossed optical disk 51).

In a second step, the DAC (1) 9 and the DAC (2) 10 are reset to make their outputs to be zero, and then the switch SW1 is switched on to establish the connection between the semiconductor laser 1 and the V-I converter 11 to supply the output electric current from the V-I converter 11 to the semiconductor laser 1. Then, the switch SW2 is switched on so as to supply the high frequency electric current, which is the output from the high frequency oscillating circuit 14, to the semiconductor laser 1.

Then, the CPU 5 reads, from the ROM 7, the semiconductor laser beam quantity (RP) to be emitted at the time of reproducing information to transfer corresponding bit data DR to the DAC (1) 9 for setting the read power. As a result, the output voltage from the DAC (1) 9 is converted into an electric current by the V-I converter 11 so that it is supplied to the semiconductor laser 1 as a drive current.

The CPU 5 reads the detected quantity of the emitted laser beam (PRI), which is the output from the A/D converter 6 to calculate PRI–RP which is the error between the actual quantity of the emitted semiconductor laser beam and the desired quantity of the semiconductor laser beam. If the error is larger than zero, the instructed value of output from the DAC (1) 9 is reduced. If the error is smaller than zero, the instructed value of the output from the DAC (1) 9 is enlarged. Since the electric current to be supplied to the semiconductor laser 1 is changed in accordance with the change in the instructed value of the output from the DAC (1) 9, the quantity of the semiconductor laser beam to be emitted is changed.

The CPU 5 again reads the output (PR2) from the A/D converter 6 to calculate an error PR2–RP. If the error is zero, setting of the instructed value of the output from the DAC (1) 9 is completed, the setting being intended to change the electric current to be supplied in accordance with the characteristics of the semiconductor laser for causing the semiconductor laser 1 to emit a laser beam with predetermined power (the read power) for reproducing information. If the error is not zero, the instructed value of the output from the DAC (1) 9 is changed until the error is converged to zero.

The operation according to this embodiment until the second step is performed similarly to the first embodiment.

After setting of the instructed value of the output from the DAC (1) 9 has been completed in the second step, the CPU 5 temporarily stops monitoring of the output from the A/D converter 6.

In a third step, the focus servo and the tracking servo are introduced in a state where the semiconductor laser is emitted in a quantity for reproducing information.

In the third step, the CPU 5 controls a focus-directional actuator (not shown) of the pickup portion after setting of the DAC (1) 9 has been completed to perform an automatic focusing operation for automatically bringing the beam spot of the laser beam emitted by the semiconductor laser 1 on the focus introducing portion 57 of the disk to perform the focus servo operation.

Then, the movable portion 21 of the pickup portion is moved toward the outer portion of the disk (in a direction toward the tracking introducing portion 58) until the tracking error signal can be detected. At the position of the tracking introducing portion 58, the tracking servo operation is performed.

In a fourth step, the type of the mounted disk is recognized.

In the fourth step the CPU 5 detects, from the reproduced data which is the output from the information reproducing means 8, the sector mark formed in the leading portion of the sector in a state where the tracking servo is effected. After the sector mark has been detected, the CPU 5 continuously reads the reproduced data obtained by the information reproducing means 8 to recognize the ID information of the sector, from which information is being reproduced, in accordance with the reproduced data in the header region. After the ID information has been recognized, the CPU 5 is able to recognize the track which is being irradiated with the laser beam.

A disk conforming to the ISO standard or the ECMA standard, as shown in the lower side of FIG. 10, has a track region, called a control zone 60, on which the information of the disk has been recorded, the control zone 60 being formed in the inner portion of the disk. The CPU 5 calculates the number of seeking lines present from the track, which is being irradiated with the laser beam, to the control zone 60 in accordance with the track number recognized by the tracking introducing portion 58 so as to move the pickup to the control zone 60.

By reading information in the control zone 60, the type of the mounted disk can be recognized such that whether or not the disk is the partially-embossed-type disk can be recognized. In accordance with the detected type of the disk, the reproducing semiconductor laser power and so forth are made to be optimum values in the ensuing process. If the disk is the fully-rewritable disk, the quantity of the semiconductor laser beam to be emitted is controlled similarly to the first embodiment. If the disk is the partially-embossed-type disk, the quantity of the semiconductor laser beam to be emitted is controlled in a difference manner between the recording and reproducing data region and the reproduction-only data region.

The process to be performed after the partially-embossed-type disk has been mounted will now be described.

In a fifth step, the optimum quantity of the laser beam is emitted to the information-rewritable recording and reproducing data region 55 by updating the instructed output value from the DAC (1) 9.

In the fifth step, the pickup portion is moved to the test zone 59 formed in the inner portion of the disk so as to, similarly to the information rewritable user data region, irradiate the tracks of the test zone 59 having no pit in the data region thereof with the laser beam emitted by the semiconductor laser 1 and determined in accordance with the instructed output value in the second step.

The CPU 5 detects the sector mark from the data reproduced by the information reproducing means 8 and then reads the ID information from the reproduced data in the header region.

Since the CPU 5 is able to calculate the time in which the beam spot of the laser beam is moved from the position, at which the sector mark or the ID information is recorded, to the start point of the recording and reproducing data region (the data region in which information is not recorded in the form of pits) 55 in accordance with the format of the mounted disk read in the control zone 60 in the fourth step, the CPU 5 waits for the movement of the laser beam to the start point of the recording and reproducing data region 55 for a predetermined time and then transmits a sampling timing signal to the A/D converter 6 to read the detected quantity of the emitted laser beam (PR3) which is the output from the A/D converter 6. After a predetermined time has passed that is required for the laser beam to reach the header region of the next sector, the CPU 5 stops monitoring of the output from the A/D converter 6 until the irradiation beam moves to the next recording and reproducing data region 55. As described above, the CPU 5 detects the quantity of the emitted semiconductor laser beam only in a period in which the recording and reproducing data region 55 is irradiated with the laser beam emitted by the semiconductor laser 1.

In a case of a disk having spiral tracks thereof, the track jumping operation must be performed in order to maintain the irradiation beam at a surface of a specific track. The operation when the track jumping operation is carried out will now be described with reference to FIG. 12.

Figure 12:
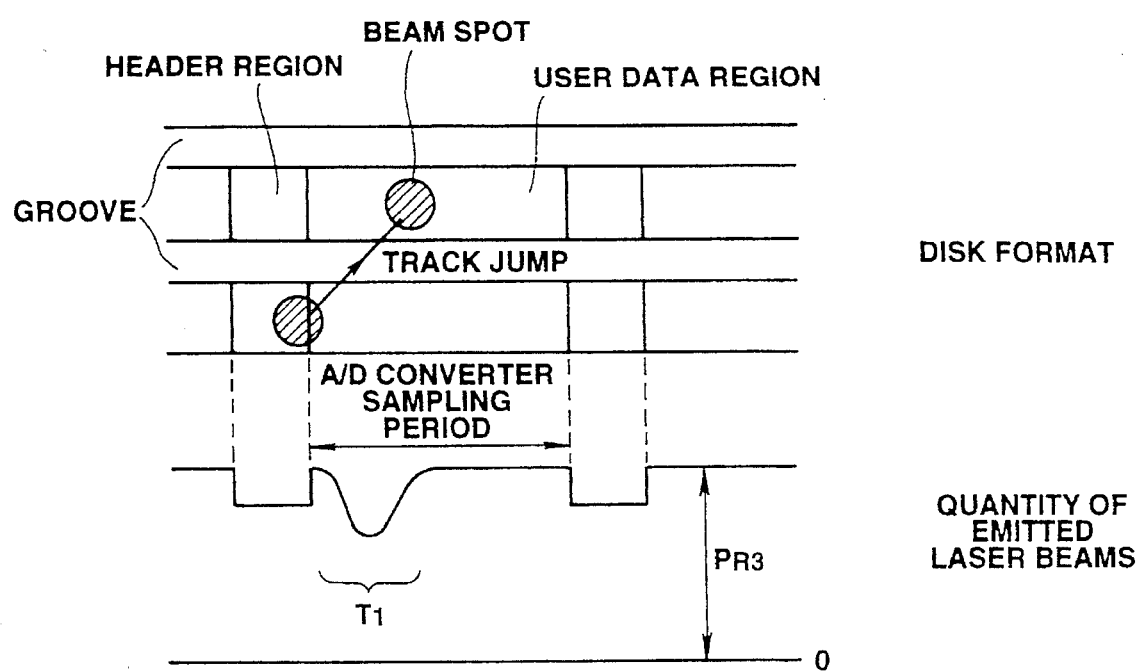

As shown in FIG. 12, when the track jumping operation for moving the beam spot to the next track is performed, influence of the diffraction occurring in the groove undesirably lowers the detected quantity of the emitted laser beam (PR3), which is the output from the A/D converter 6 that is a detected value of the quantity of the laser beam emitted by the semiconductor laser 1, in period T1 in which the beam spot is positioned in a groove formed between tracks during the movement of the pickup portion. That is, the influence of the diffraction occurring due to the groove when the irradiation beam traverses the grove at the time of the track jumping operation undesirably changes the quantity of returned light when the irradiation beam is positioned in the data region that enables information to be recorded and reproduced. Thus, the quantity of the emitted semiconductor laser beam cannot be detected accurately.

In this embodiment, the sampling timing signal is transmitted to the A/D converter 6 to detect the quantity of the laser beam emitted by the semiconductor laser 1 in the period in which the beam spot is positioned in the data region. If the sampling period for the A/D converter and the timing of the track jumping operation overlap to each other, the CPU 5 stops the transmission of the sampling signal to the A/D converter 6 in the period of the track jumping operation and reads the ID information of the next sector to which track jumping has taken place. In the next data region, the CPU 5 transmits the sampling timing signal to read the detected quantity of the emitted laser beam (PR3).

By stopping sampling of the A/D converter at the time of the track jumping operation, the quantity of the emitted semiconductor laser beam is not detected when the irradiation beam transverse the groove formed between the tracks. As a result, the following problem can be overcome: when the irradiation beam traverses the groove between the tracks, the quantity of returned light undesirably becomes different from that observed when the irradiation beam is positioned on the track of the data region that enables information to be recorded and reproduced; and thus a value of the quantity of the emitted semiconductor laser beam that is different from that obtained in the data region is detected. Therefore, the quantity of the emitted semiconductor laser beam can be detected accurately.

After the CPU 5 has read the detected quantity of the emitted laser beam (PR3), which is the output from the A/D converter 6, the CPU 5 reads, from a data table in the ROM 7, the desired quantity of the semiconductor laser beam (RP) that corresponds to the mounted disk to compare TR3 and RP. If any error is found, the instructed value of the output from the DAC (1) 9 is changed to cause the emitted semiconductor laser beam quantity to be the desired quantity of the semiconductor laser beam.

As described above, monitoring of the output from the A/D converter 6 to be performed to detect the quantity of the emitted semiconductor laser beam is carried out while setting the period in accordance with the format of the mounted disk. Therefore, the output from the A/D converter 6 can be monitored in only the recording and reproducing data region 55. Therefore, the quantity of the emitted semiconductor laser beam can be detected while assuredly avoiding the header region or the like having pits.

The operations for sampling the A/D converter 6 and reading the output from the A/D converter by the CPU 5 may be performed plural times in a period in which the irradiation beam emitted by the semiconductor laser 1 is positioned in the data region to average the detected values to make the average to be the quantity of the semiconductor laser beam to be emitted. By performing the foregoing process, the disk can be protected from damage and influence of a disturbance such as noise can be eliminated. Thus, the quantity of the emitted semiconductor laser beam and the quantity of the semiconductor laser beam to be emitted can be controlled more accurately.

When the error in the recording and reproducing data region 55 between the detected quantity of the emitted semiconductor laser beam and the desired quantity of the semiconductor laser beam has been made zero and the instructed value of the output from the DAC (1) 9 has been updated, the CPU 5 again stops monitoring of the output from the A/D converter 6.

Then, the change in the characteristics of the semiconductor laser occurring due to the ambient temperature or the like and generation of an error between the quantity of the emitted semiconductor laser beam and the desired quantity of the semiconductor laser beam are prevented by the CPU 5 that repeats the foregoing operation in the fifth step that it updates the instructed value of the output from the DAC (1) 9 at predetermined intervals until an instruction to record or reproduce information is supplied from the host computer of an optical information reproducing apparatus (not shown).

Thus, the initial operation for setting the quantity of the semiconductor laser beam to be emitted in the initial stage is completed.

In a sixth step, description will be made about an operation for controlling the quantity of the semiconductor laser beam to be emitted if an instruction to reproduce information transmitted by the host computer has been supplied.

If the instruction to reproduce information has been issued by the host computer and it has been received by the CPU 5 in a case where the desired track having information to be reproduced thereon is different from the track which is being subjected to tracking, the CPU 5 stops the detection of the quantity of the emitted semiconductor laser beam while avoiding the header region and the operation for updating the instructed value of the output from the DAC (1) 9 that are performed at predetermined intervals. The CPU 5 moves the pickup portion to the desired track while maintaining the instructed value of the output from the DAC (1) 9.

Since the irradiation beam emitted by the semiconductor laser 1 is positioned in the test zone 59 when the fifth step has been completed, an assumption is made that the irradiation beam emitted by the semiconductor laser 1 is, in the initial stage of the sixth step, positioned on the track of the test zone 59 that has the recording and reproducing data region 55.

In this embodiment, the quantity of the semiconductor laser beam to be emitted at the time of reproducing information is performed in different manners depending upon the fact the track that is being subjected to tracking and the track to which the irradiation beam will be moved are regions having the recording and reproducing data region 55 or the region having the reproduction-only data region.

[1] Initially, the description will be made about the operation to be performed in a case where the track, which is being subjected to tracking, is positioned in the track region B having the recording and reproducing data region (user data region) 55 or in the test zone 59 and as well as the track, to which the irradiation beam will be moved, is positioned in the track region B.

In this case, after the movement of the pickup portion onto the desired track has been completed, the CPU 5 restarts the detection of the quantity of the emitted semiconductor laser beam by monitoring the output from the A/D converter 6 to be performed in the data region (in the user data region 55 or the data region of the test zone) having no pit while avoiding the header region and the operation for updating the instructed value of the output from the DAC (1) 9. At similar timing to that of the detection of the quantity of the emitted semiconductor laser beam in the track of the test zone 59 performed in the fifth step of the initial operation, the output from the A/D converter is sampled to update the instructed value of the output from the DAC (1) 9 in such a manner that the error from the desired quantity of the semiconductor laser beam is converged to zero. The operation of updating instructed value of the output from the DAC (1) 9 is repeated at predetermined intervals.

[2] Then, the description will be made about the operation to be performed in the case where the track, which is being subjected to tracking, is positioned in the track region B having the recording and reproducing data region (user data region) 55 or in the test zone 59 and the track, to which the irradiation beam will be moved, is positioned in the track region A having the reproduction-only data region 54.

After the movement of the pickup portion onto the track has been completed, the CPU 5 detects the sector mark from the reproduced data by the information reproducing means 8, Then, the CPU 5 reads the ID information of the sector from the data reproduced from the header region. If the disk conforms the ISO standard or the ECMA standard, a region, called, an offset detection field, having no pit, is formed between the header region and the data region. The CPU 5 causes the semiconductor laser 1 to emit a laser beam while maintaining the output from the DAC (1) 9 set in the final stage of the fifth step. The CPU 5 waits for a predetermined time for the movement of the irradiation beam to pass through the foregoing offset detection field and to reach the start point of the reproduction-only data region 54. Then, the CPU 5 transmits a sampling timing signal to the A/D converter 6 to read the detected quantity of the emitted laser beam (PR4) which is the output from the A/D converter 6.

Similarly to the fifth step, sampling of the A/D converter 6 and reading of the output from the A/D converter 6 by the CPU 5 may be performed plural times in a period in which the irradiation beam emitted by the semiconductor laser 1 is positioned in the data region for the purpose of further accurately detect the quantity of the emitted semiconductor laser beam, the results being averaged to be made the quantity of the semiconductor laser beam to be emitted.

Then, the CPU 5 causes the output value (PR4) from the A/D converter 6, which is the detected quantity of the emitted laser beam in the reproduction-only data region 54 having pits, to be stored in the RAM 15 as a desired quantity (RP') of the semiconductor laser beam to be emitted in the track region A for only reproduction of information.

As the desired quantity of the semiconductor laser beam for controlling the quantity of the semiconductor laser beam to be emitted, the CPU 5 does not use RP read from the ROM 7 in the fifth step but uses the RP' obtained in the foregoing measurement operation in a period in which the track in the reproduction-only track region A is irradiated with the irradiation beam emitted by the semiconductor laser 1.

Since the quantity of returned light in the track region A is smaller as compared with the user data region 55 due to the influence of the diffraction occurring in the pits, the detected quantity of the emitted laser beam is made to be smaller in the reproduction-only data region 54 due to the difference in returned light although the track is irradiated with the emitted semiconductor laser beam even if the drive current and so forth are the same. In this embodiment, an electric current, which is the same as the drive current with which the desired quantity RP of the semiconductor laser beam to be emitted which is stored in the ROM can be obtained, is supplied to the semiconductor laser 1 in the user data region 55 in the recording and reproducing track region B. The quantity of the semiconductor laser beam emitted in the reproduction-only data region 54 at this time is made to be the desired quantity RP' of the semiconductor laser beam to be emitted in the reproduction-only track region A, the desired quantity RP' of the semiconductor laser beam to be emitted being used in the track region A to control the quantity of the semiconductor laser beam to be emitted.

If the desired quantity (RP') of the semiconductor laser beam to be emitted has been stored in the RAM 15, the CPU 5 restarts the detection of the quantity of the emitted semiconductor laser beam by monitoring the output from the A/D converter and the operation for updating the instructed value of the output from the DAC (1) 9 in the data region while avoiding the header region. The CPU 5 samples the output from the A/D converter 6 at similar timing to that of the detection of the quantity of the emitted semiconductor laser beam in the track of the test zone 59 performed in the fifth step of the initial operation. Furthermore, the CPU 5 updates the instructed value of the output from the DAC (1) 9 to make, to be zero, the error from the desired quantity (RP') of the semiconductor laser beam to be emitted. Then, the CPU 5 repeats the operation for updating the instructed value of the output from the DAC (1) 9 at predetermined intervals.

Figure 13B:
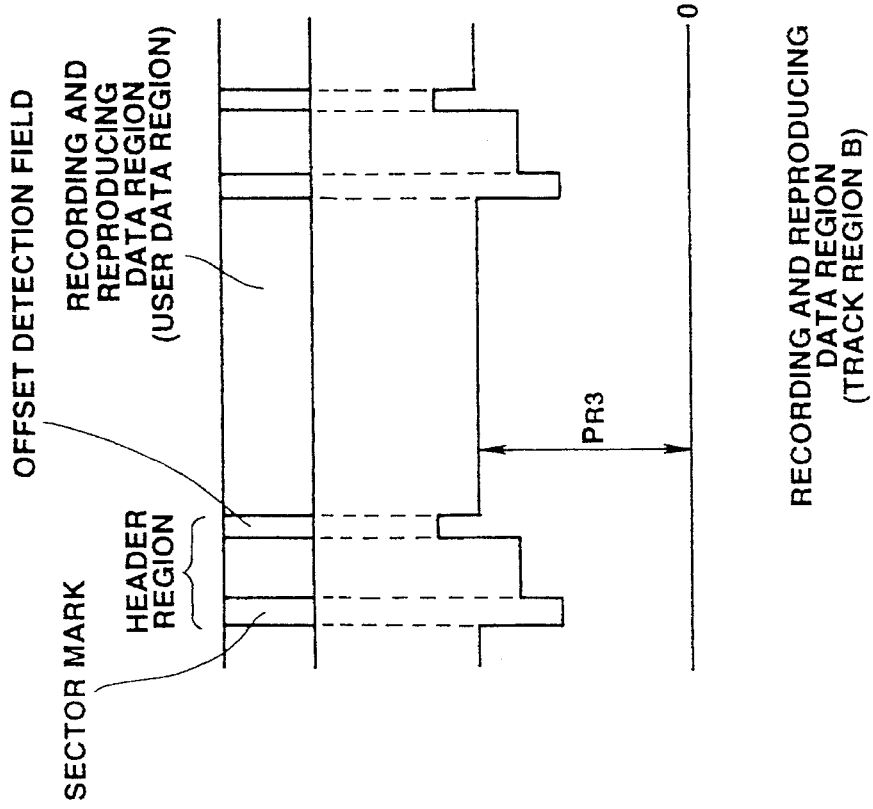
Figure 13A:
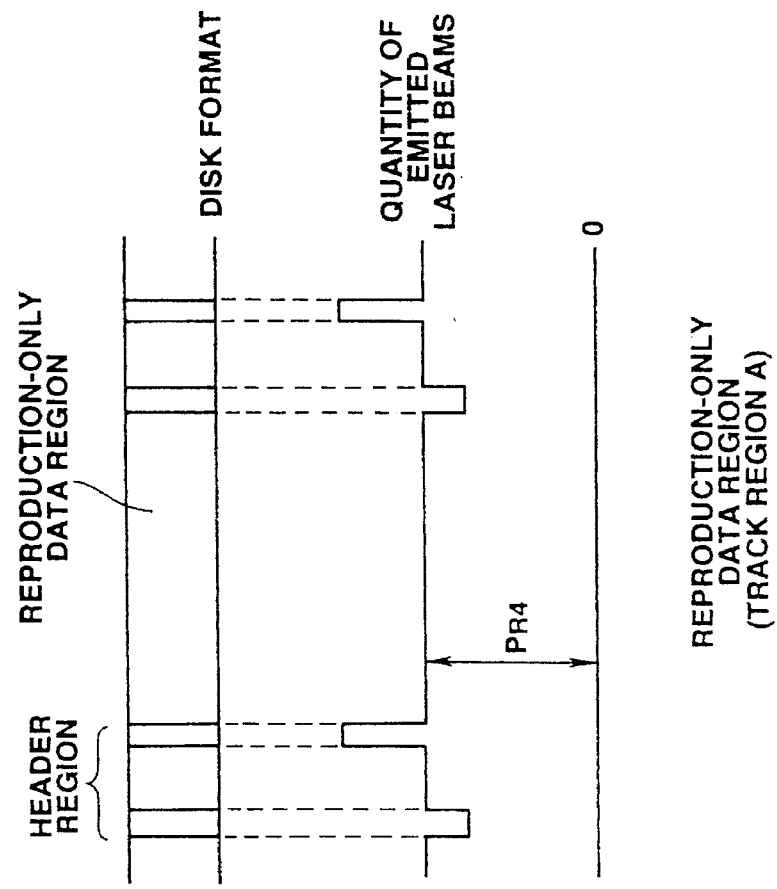
FIG. 13A illustrates the quantity of the laser beam emitted by the semiconductor laser in a track region B that enables information to be recorded and reproduced.

FIGS. 13A and 13B show the detected quantity of the emitted laser beam in each track of the track region B (see left FIG. 13A) comprising the user data region 55 having no pit and enabling information to be recorded and reproduced and the track region A (see right FIG. 13B) comprising the reproduction-only data region 54 having information in the form of pits and enabling only reproduction of information.

In the header region having information in the form of pits, the track region A and the track region B have similar structure. Therefore, the quantity of returned light is smaller than that (PR3) in the user data region 55 due to the diffraction occurring in the pits and thus the quantity of the emitted laser beam is smaller than the detected quantity of the emitted laser beam in the user data region 55. Since the sector mark formed in the leading portion of the header region has a longer pit length than that in the reproduction-only data region, the quantity of light returned by the sector mark due to the influence of the diffraction is further smaller, thus causing the quantity of the emitted laser beam to be smaller. Since the offset detection field has no pit, a large quantity of light is returned and therefore the quantity of the emitted laser beam is enlarged.

As for the detected quantity (PR4) of the emitted laser beam in the reproduction-only data region 54, the quantity of returned light is, similarly to the header region, smaller than that in the user data region 55 due to the diffraction of the pits. Therefore, if the electric current to be supplied to the semiconductor laser 1 is made to be the same, the quantity of the emitted semiconductor laser beam is made to be smaller than the detected quantity (PR3) of the emitted laser beam in the user data region 55. In the reproduction-only data region 54, the desired quantity of the semiconductor laser beam is changed from RP to RP' in accordance with the change in the quantity of the emitted laser beam occurring due to the difference in the quantity of returned light; the detected quantity (PR4) of the emitted laser beam, which is the output from the A/D converter 6, and the desired quantity of the semiconductor laser beam are subjected to a comparison; the instructed value of the output from the DAC (1) 9 is updated in such a manner that the error is made to be zero, so that the quantity of the semiconductor laser beam to be emitted is controlled.

Since change of the temperature in the apparatus that changes the characteristics of the semiconductor laser cannot take place in a short time in which the pickup portion is moved from the track region B or the test zone to the track region A, the foregoing control of the quantity of the semiconductor laser beam to be emitted enables the electric current to be supplied to the semiconductor laser to be the same as that for the track region B or the track in the test zone 59 before the pickup portion is moved.

The foregoing control is performed depending upon the influence of the returned light caused from the presence and absence of the pits, the control being performed in such a manner that the desired quantity of the semiconductor laser beam is changed while maintaining the electric current to be supplied to the semiconductor laser. Thus, even if the pickup portion is again moved from the track region A to the track region B that enables information to be recorded and reproduced, the recording and reproducing data region can be irradiated with the semiconductor laser beam in an optimum quantity. Therefore, the necessity of again adjusting the quantity of the semiconductor laser beam to be emitted can be eliminated.

The measurement of the quantity of the emitted semiconductor laser beam for the purpose of setting the desired quantity of the semiconductor laser beam in the track region A is performed while avoiding the sector mark portion and the offset detection field formed between the header region and the data region and having no pit, the sector mark portion having a longer pit length than that of the pits in the reproduction-only data region and thus having different quantity of returned light, which depends upon the diffraction, from that in the short-pit reproduction-only data region. Therefore, even if light is returned from the recording medium to the semiconductor laser, the quantity of the laser beam emitted by the semiconductor laser, with which the information-reproduction-only track region A is being irradiated, can be measured accurately. Thus, the desired quantity of the semiconductor laser beam can be set accurately.

In a case where information is continuously reproduced in the track region A for a long time after the pickup portion has been moved from the track region B to the track region A, the temperature in the apparatus can be changed and thus the characteristics of the semiconductor laser can be changed.

Also in this case, the CPU 5 detects, at predetermined intervals, the quantity of the emitted semiconductor laser in the data region while avoiding the header region by monitoring the output from the A/D converter 6 and performs the operation for updating the instructed value of the output from the DAC (1) 9 so that the quantity of the semiconductor laser beam to be emitted is controlled in such a manner that the error from the desired quantity (RP') of the semiconductor laser beam to be emitted, which has been subjected to the correction of the difference in the quantity of returned light, is made to be zero.

If the quantity of the semiconductor laser beam to be emitted is controlled by making the desired quantity of the semiconductor laser beam to be different in the track region A so as to prevent the change in the drive current for the semiconductor laser for the purpose of causing the semiconductor laser beam to be emitted in an optimum quantity in the recording and reproducing data region, an error is sometimes generated from the optimum quantity of the semiconductor laser beam to be emitted in the header region and the reproduction-only data region in which information is recorded in the form of pits. However, the information in the region containing information in the form of pits is reproduced in such a manner that a signal is reproduced in accordance with the change in the level of returned light in a manner different from that performed in the rewritable user data region in which the weak signal is reproduced by using the Kerr effect. Therefore, even if the quantity of the emitted semiconductor laser beam has been reduced, information can be reproduced with an excellent C/N ratio. Furthermore, the information pits do not deteriorate even if the quantity of the emitted semiconductor laser beam has been enlarged. Therefore, the somewhat change in the quantity of the emitted semiconductor laser beam in the header region and the reproduction-only data region does not raise a problem.

[3] The description will now be made about the operation to be performed in the case where the track, which is being subjected to tracking, is positioned in the track region A and the track, to which the semiconductor laser beam will be moved, is positioned in the track region B.

Similarly to the case where the movement from the track region B is performed, the CPU 5 stops the detection of the quantity of the emitted semiconductor laser beam performed at predetermined intervals while avoiding the header region and the operation for updating the instructed value of the output from the DAC (1) 9. The CPU 5 moves the pickup portion to a desired track while maintaining the instructed value of the output from the DAC (1) 9.

After the movement of the pickup portion onto the track has been completed, the CPU 5 restores the desired quantity of the semiconductor laser beam from RP' obtained as a result of the measurement performed in the track region A to the quantity RP (the read power) of the semiconductor laser beam to be emitted at the time of reproducing information. Furthermore, the CPU 5 restarts the detection of the quantity of the emitted semiconductor laser beam to be performed in the data region while avoiding the header region by monitoring the output from the A/D converter 6 and the operation for updating the instructed value of the output from the DAC (1) 9. The CPU 5 samples the output from the A/D converter 6 at similar timing to that of the detection of the quantity of the emitted semiconductor laser beam on the track in the test zone 59 performed in the fifth step of the initial operation to update the instructed value of the output from the DAC (1) 9 in such a manner that the error from the desired quantity of the semiconductor laser beam is converged to zero. The CPU 5 repeats the foregoing operation to update the instructed value of the output from the DAC (1) 9 at predetermined time intervals.

[4] The description will be made about the operation to be performed in the case where the track, which is being subjected to tracking, is positioned in the track region A and the track, to which the semiconductor laser beam will be moved, is similarly positioned in the track region A.

After the movement of the pickup portion onto the track has been completed, the CPU 5 restarts the detection of the quantity of the emitted semiconductor laser beam to be performed in the track region A before the movement while avoiding the header region by monitoring the output from the A/D converter 6 and the operation for updating the instructed value of the output from the DAC (1) 9.

When the quantity of the emitted semiconductor laser beam sampled by the output from the A/D converter 6 is used to update the instructed value of the output from the DAC (1) 9, the basic conditions are the same because pits are present in the data regions to and from which the pickup portion is moved. Therefore, the desired quantity of the semiconductor laser beam that is subjected to the comparison with the detected value is RP', as it is, obtained by the measurement performed immediately after the pickup portion has been moved from the track region B to the track region A.

Since the dispersion of the reflectance and the like in the radial direction of the disk are not zero, the quantity of light returned from the disk to the semiconductor laser is changed in the radial direction. Thus, an error is sometimes generated from the desired quantity RP' of the semiconductor laser beam in the radial direction, the desired quantity RP' being used to correct the influence of returned light occurring due to the presence or absence of the pits. In a case of a disk conforming to the ECMA standard and sometimes having plurality of track regions A formed in band units in the radial direction of the disk, the following method may be employed in a case where the bands including the tracks, to and from which the pickup portion is moved, are not positioned adjacently: after the movement of the pickup portion onto the track has been completed, the detection of the quantity of the emitted semiconductor laser beam, which is the output from the A/D converter 6, is performed similarly to that performed when the pickup portion is moved from the recording and reproducing track region B to the reproduction-only track region A so that the desired quantity of the semiconductor laser beam, which has been subjected to the correction of the influence of returned light, is again determined. Another arrangement may be employed in which the desired quantity of the semiconductor laser beam is again determined without exception whenever the movement to the track in a different band is performed. As a result, the quantity of the semiconductor laser beam to be emitted can be controlled more precisely.

As described above, according to this embodiment, also in a case where the partially-embossed-type disk is used in which two types of data regions, consisting of the reproduction-only data region having information in the form of pits formed at the time of manufacturing the disk and inhibiting information to be rewritten and the recording and reproducing data region that enables information to be rewritten are present in one disk in a mixed manner, the quantity of the semiconductor laser beam to be emitted can be accurately controlled to cause optimum reproducing power to be realized in the information-rewritable user data region even if light is returned from the recording medium to the semiconductor laser. Therefore, the deterioration in the recorded data due to the excessive enlargement of the semiconductor laser power can be prevented. Furthermore, erroneous reproduction of information due to lowering of the power can be prevented.

Even if the pickup portion is moved from the track region A that enables only reproduction of information to the track region B that enables information to be recorded and reproduced, the control is performed in such a manner that the electric current to be supplied to the semiconductor laser is not changed. Therefore, the necessity of again adjusting the electric current to be supplied to the semiconductor laser immediately after the pickup portion has been moved between different data regions can be eliminated. Since the waiting time for performing the re-adjustment is not required at the time of operating the apparatus, the deterioration in the apparatus, such as lowering of the transfer rate at the time of recording information, can be prevented.

Furthermore, the desired quantity of the semiconductor laser beam in the data region that enables only reproduction of information is determined on the basis of the quantity of the semiconductor laser detected by supplying the electric current, the quantity of which is the same as that of the electric current supplied to the semiconductor laser when the quantity of the semiconductor laser beam to be emitted is controlled in the data region that enables information to be recorded and reproduced. Therefore, the desired power for the semiconductor laser in the information-reproduction-only data region can be determined while including the difference in the reflectance of each of the mounted disks and the dispersion caused from molding of the pits. Thus, the desired quantity of the semiconductor laser beam that corresponds to the mounted disk can be determined adequately. As a result, the quantity of the semiconductor laser beam to be emitted can be controlled adequately to correspond to the medium.

A third embodiment of the present invention will now be described with reference to FIG. 14 as another example for overcoming the problems involved when information is reproduced from the partially-embossed-type optical information recording medium.

As described above, the second embodiment has the arrangement that: the means for controlling the semiconductor laser output has the structure that the quantity of the semiconductor laser beam to be emitted, which is a digital value obtained by converting the output from the light detection means 4 by the A/D converter, and data of the desired quantity of the semiconductor laser beam stored in the ROM 7 or the actually measured digital value which is stored in the RAM 15 and which is the desired quantity of the semiconductor laser beam, are subjected to a comparison and are calculated in the CPU 5 in a digital manner so that the electric current to be supplied to the semiconductor laser 1 is determined. On the other hand, the third embodiment has an arrangement that the means for controlling the semiconductor laser output is structured in such a manner that the output from the light detection means, which corresponds to the quantity of the emitted semiconductor laser beam, and a voltage output, which corresponds to a desired quantity of the semiconductor laser beam emitted by a variable-voltage power source composed of a D/A converter and the like are subjected in a comparator in an analog manner so that the electric current to be supplied to the semiconductor laser is determined.

Figure 14:
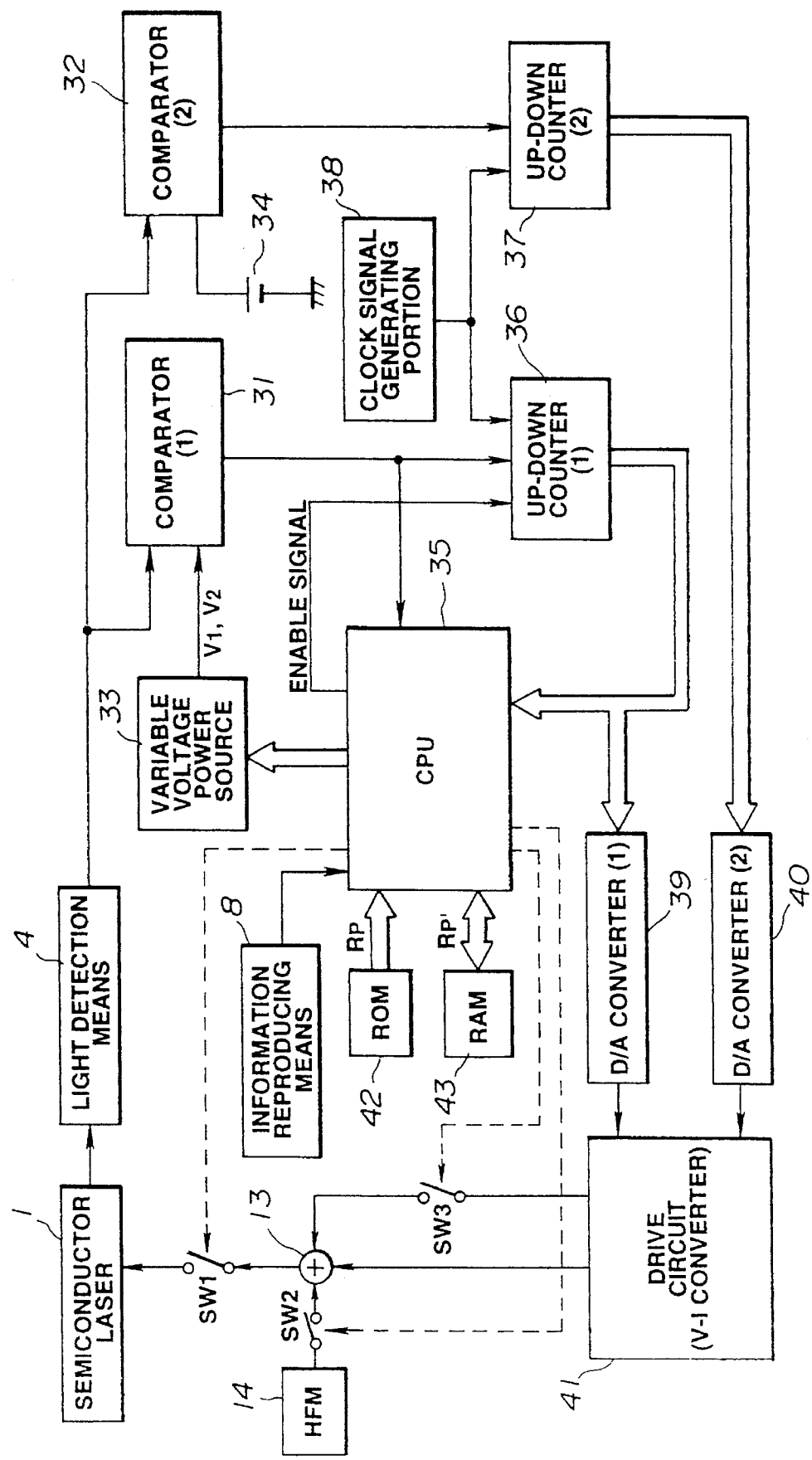
FIG. 14 is a block diagram which illustrates the structure of a semiconductor laser output control means of an optical information reproducing apparatus according to a third embodiment of the present invention.

The means for controlling the semiconductor laser output according to the third embodiment is composed of a circuit arranged as shown in FIG. 14. The light detection means 4 for detecting a portion of the laser beam emitted by the semiconductor laser 1 has an output portion including a comparator (1) 31 for comparing the output from the light detection means 4 and the output from the variable voltage power source 33 and a comparator (2) 32 for comparing the output from the light detection means 4 and a predetermined reference voltage 34.

Furthermore, a CPU 35 for controlling apparatus is provided to which are connected: a ROM 42 that stores the desired quantity of the semiconductor laser beam to be emitted at the time of, for example, reproducing information; a RAM 43 that stores a desired quantity of the semiconductor laser beam to be emitted in a data region that enables only reproduction of information when the apparatus is operated; and the information reproducing means 8 for reproducing information recorded on the recording medium in response to a reproduction signal obtainable from light reflected by the recording medium.

The CPU 35 is connected to the variable voltage power source 33 so as to transmit a setting signal for setting the output from the variable voltage power source 33 to be a voltage level that corresponds to the desired quantity of the semiconductor laser beam stored in the ROM 42 or the RAM 43. The up-down counters (1) 36 and (2) 37 count clock signals generated by a clock signal generating portion 38 in accordance with the outputs from the comparators (1) 31 and (2) 32. The output value from the up-down counter (1) 36 corresponds to the quantity of the semiconductor laser beam (the read power) to be emitted at the time of reproducing information, while the output value from the up-down counter (2) 37 corresponds to a value which is added to the read power in order to obtain the quantity of the semiconductor laser beam (the peak power) to be emitted at the time of recording information.

The output from the comparator (1) 31 is as well as supplied to the CPU 35. The CPU 35 transmits an enable signal for permitting the up-down counter (1) 36 to count the clock signals.

A D/A converter (1) 39 is connected to the output terminal of the up-down counter (1) 36 so that the output value from the up-down counter (1) 36 that corresponds to the quantity of the semiconductor laser beam to be emitted at the time of reproducing information is converted into an analog voltage level by the D/A converter (1) 39. A D/A converter (2) 40 is connected to the output terminal of the up-down counter (2)

37 so that the output value from the up-down counter (2) 37 that is the value added for the purpose of obtaining the peak power at the time of recording information is converted into an analog voltage level by the D/A converter (2) 40.

The D/A converters (1) 39 and (2) 40 are connected to a drive circuit 41 comprising a V-I converter. Thus, the output voltages from the D/A converters (1) 39 and (2) 40 are respectively converted into electric currents so that an electric current for driving the semiconductor laser at the time of reproducing information and a drive electric current to be added for the purpose of obtaining the peak power at the time of recording information are generated.

The drive current of the two outputs from the drive circuit 41 for driving the semiconductor laser at the time of reproducing information is directly supplied to an adder circuit 13, while the drive current to be added for the purpose of obtaining the peak power at the time of recording information is supplied to the adder circuit 13 through the switch SW3. The adder circuit 13 is arranged to receive a high-frequency electric current transmitted by the high-frequency oscillating circuit 14 through the switch SW2. The output terminal of the adder circuit 13 is connected to the semiconductor laser 1 through the switch SW1 so that the electric currents superimposed in the adder circuit 13 are, as a drive current, supplied to the semiconductor laser 1.

The other portions are arranged to be similar to those of the second embodiment and their descriptions are omitted here.

In the third embodiment, the switches SW1, SW2 and SW3 are, similarly to the second embodiment, switched on and off under the control of the CPU 35 at the time of reproducing or recording information so that the semiconductor laser 1 is caused to emit the laser beam in a predetermined quantity. Furthermore, the quantity of the semiconductor laser beam to be emitted is controlled in such a manner that the quantity of the laser beam emitted by the semiconductor laser 1 is detected to make the error from the desired quantity of the semiconductor laser beam to be zero.

Also in this embodiment, the description will now be made about only the control of the quantity of the semiconductor laser beam to be emitted at the time of reproducing information in the case where the partially-embossed-type disk is used.

Similarly to the second embodiment, the quantity of the semiconductor laser beam to be emitted is controlled as the initial operation in the test zone 59 comprising a data region having no pit similarly to the user data region that enables information to be recorded and reproduced so that the semiconductor laser beam in an optimum quantity for the user data region is emitted.

The CPU 35 turns on the enable signal for the up-down counter (1) 36 to permits the counting operation to be performed when the quantity of the laser beam emitted by the semiconductor laser 1 is detected and the input value for the D/A converter (1) 39 is updated.

At this time, the comparator (1) 31 compares the detected quantity of the laser beam emitted by the semiconductor laser 1, which is transmitted by the light detection means 4, and output (V1 from the variable voltage power source 33 determined to be a voltage level which corresponds to a predetermined desired quantity (RP) of the semiconductor laser beam at the time of reproducing information. If an error is generated between the voltage level detected by the light detection means 4 and corresponding to the quantity of the emitted semiconductor laser beam and the output (V1) from the variable voltage power source 33, the output from the comparator (1) 31 is turned on. When the output from the comparator (1) 31 is turned on, the up-down counter (1) 36 counts the clock signals so that the output from the up-down counter (1) 36 is changed.

When the output from the up-down counter (1) 36 is changed, the output from the D/A converter (1) 39, which corresponds to the change in the output from the up-down counter (1) 36, and the electric current, which is supplied to the semiconductor laser 1 and which is the output from the drive circuit 41, are changed. As a result, the quantity of the laser beam emitted by the semiconductor laser 1 is changed.

When the emitted semiconductor laser beam quantity has been made to be the same as the desired quantity (RP) of the semiconductor laser beam, the difference from the output voltage from the light detection means 4 to the output (V1) from the variable voltage power source 33 is made to be zero. Thus, the output from the comparator (1) 31 is turned off. As a result, the output from the up-down counter (1) 36 is brought into a hold state. Thus, the adjustment of the quantity of the laser beam emitted by the semiconductor laser 1 is completed.

In the foregoing analog-type structure, turning on off of the enable signal for the up-down counter (1) 36 shown in FIG. 14 is, similarly to the sampling timing of the A/D converter 6 shown in FIG. 11, controlled by the CPU 35 at predetermined intervals while avoiding the header region so that a similar effect obtainable from the foregoing digital method is obtained. Thus, the emitted semiconductor laser beam quantity can be controlled accurately such that the semiconductor laser beams is emitted in an optimum quantity in the user data region and the data region in the test zone that enable information to be recorded and reproduced.

That is, when the power for causing the semiconductor laser to emit the semiconductor laser beam in the information-rewritable user data region is adjusted, the CPU 35 turns on the enable signal terminal of the up-down counter (1) 36 while avoiding the header region. If a different takes place between the output voltage from the light detection means 4 and the output (V1) from the variable voltage power source which is determined to be the voltage level that corresponds to the predetermined desired quantity RP of the semiconductor laser beam in the user data region and read from the ROM 42, the output from the up-down counter (1) 36 is changed until the difference is made to be zero. In accordance with the change in the output from the up-down counter (1) 36, the output from the D/A converter (1) 39 and the electric current, which is supplied to the semiconductor laser and which is the output from the drive circuit 41, are changed. Thus, the quantity of the laser beam emitted by the semiconductor laser 1 is adjusted again to be the desired quantity of the semiconductor laser beam.

When the difference from the output voltage from the light detection means 4 to the output (V1) from the variable voltage power source 33 has been made to be zero causing the output from the comparator (1) 31 to be turned off and the change in the output from the up-down counter (1) 36 to be stopped, the CPU 35 causes output value (D1) from the up-down counter (1) 36 to be stored in the RAM 43.

In order to prevent the change in the characteristics of the semiconductor laser due to the change in the temperature in the apparatus or the like that causes the quantity of the semiconductor laser beam to be changed, the CPU 35 repeats the following operation at predetermined intervals: the CPU 35 turns on the enable signal terminal of the up-down counter (1) 36 while avoiding the header region; and the CPU 35 reads the output value (D1) from the up-down counter (1) 36 obtained when the difference from the output voltage from the light detection means to the output (V1) from the variable voltage power source 33 has been made to be zero and the output from the comparator (1) 31 has been made to be turned off so to be rewrite the value stored previously in the RAM 43.

In the case where the pickup portion is moved from the recording and reproducing track region B or the test zone to the information-reproduction-only track region A in response to the instruction to reproduce information, the CPU 35 turns of the enable signal terminal of the up-down counter (1) 36 before the movement of the pickup portion and then moves the pickup portion to the desired track while maintaining the output from the variable voltage power source 33, which corresponds to the desired quantity of the semiconductor laser beam at the value (V1) in the rewritable user data region.

After the movement of the pickup portion onto the track region A has been completed, the CPU 35 turns on the enable signal for the up-down counter (1) 36 while avoiding the header region to compare the output value from the up-down counter (1) 36 and output value (D1) from the up-down counter (1) 36 stored in the RAM 43 in the information-rewritable user data region. The CPU 35 then changes the output from the variable voltage power source 33 to make the difference to be zero. At this time, the CPU 35 uses output voltage (V2) from the variable voltage power source 33 when the output value from the up-down counter (1) 36 has been made to be the same as D1 in the user data region that has been stored in the RAM 43 as the reference value corresponding to the desired quantity (RP') of the semiconductor laser beam in the information-reproducing-only track region A. Furthermore, the CPU 35 stores an instruction value to cause the variable voltage power source 33 to transmit V2 in the RAM 43.

Then, the CPU 35 uses RP' as the desired quantity of the semiconductor laser beam in the period in which the track of the reproduction-only track region A having information in the form of pits is irradiated with the irradiation beam emitted by the semiconductor laser. Furthermore, the comparator (1) 31 compares the output (V2) from the variable voltage power source 33 set to the voltage value, which corresponds to the instruction value of the desired quantity RP' of the semiconductor laser beam stored in the RAM 43, and the output from the light detection means 4. Similarly to the case of the user data region, the CPU 35 then controls the quantity of the semiconductor laser beam in such a manner that the foregoing difference is made to be zero.

As described above, the control is performed in such a manner that the desired quantity of the semiconductor laser beam in the information-reproduction-only track region A is changed not to change the electric current to be supplied to the semiconductor laser depending upon the influence of returned light due to the presence and absence of the pits. Thus, an effect similar to that obtainable in the case of the digital method can be obtained such that the semiconductor laser 1 can be controlled with the drive electric current to emit the laser beam in an optimum quantity in the user data region that enables information to be recorded and reproduced.

In the case where the pickup portion is moved from the information-reproduction-only track region A to the recording and reproducing track region B, the CPU 35 turns of the enable signal terminal of the up-down counter (1) 36. Then, the CPU 35 moves the pickup portion to a desired track while maintaining the output from the up-down counter (1) 36. Then, the CPU 35 again restores the instructed desired quantity of the semiconductor laser beam for the variable voltage power source 33 from RP' stored in the RAM 43 to RP read from the ROM 42 so as to make the output from the variable voltage power source 33 to be V1. Furthermore, the CPU 35 controls the enable signal for the up-down counter (1) 36 in such a manner that the header region is avoided. In addition, the output voltage from the light detection means 4 and the output voltage V1 from the variable voltage power source 33 are compared in the comparator (1) 31. Thus, the quantity of the semiconductor laser beam to be emitted is controlled.

By controlling the quantity of the semiconductor laser beam to be emitted as described above, an effect similar to that obtainable from the case where the quantity of the semiconductor laser beam to be emitted is controlled by the digital calculation method described in the second embodiment. Thus, even if the pickup portion has been again moved from the information-reproduction-only track region A to the track region B that enables information to be recorded and reproduced, the information-rewritable user data region can be irradiated with the semiconductor laser beam in an optimum quantity. Thus, the necessity of again adjusting the quantity of the semiconductor laser beam to be emitted can be eliminated. As a result, the deterioration of the recorded data due to the excessive enlargement of the semiconductor laser power can be prevented. Furthermore, erroneous reproduction of information due to lowering of the power can be prevented. In addition, the involved waiting time at the time of the operation of the apparatus that deteriorates the performance of the apparatus can be prevented.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. An optical information reproducing apparatus for reproducing information from an optical recording medium by irradiating said recording medium, said recording medium having a recording and reproducing and information-rewritable track region, which is composed of a header region having information, such as a sector start mark, track number and sector number, in a pit shape formed when said recording medium has been manufactured and a recording and reproducing user data region that has no pit and enables information to be recorded and reproduced, said optical information reproducing apparatus comprising;

semiconductor laser output control means for controlling a quantity of a semiconductor laser beam to be emitted to a predetermined value such that a detected quantity of an emitted semiconductor laser beam is obtained in only said user data region when the quantity of the laser beam emitted by a semiconductor laser that irradiates said recording medium with a semiconductor laser beam is detected.

2. An optical information reproducing apparatus according to claim 1, wherein said semiconductor laser output control means performs the control of the quantity of the semiconductor laser beam to be emitted to the predetermined value such that said semiconductor laser output control means performs detection of the quantity of the emitted semiconductor laser beam in only said user data region and stops the detection of the quantity of the emitted semiconductor laser beam in a period in which said header region is irradiated with the semiconductor laser beam.

3. An optical information reproducing apparatus according to claim 1, wherein said semiconductor laser output control means performs the control of the quantity of the semiconductor laser beam to be emitted to the predetermined value after a predetermined time has passed from a moment information in said header region has been reproduced so as to obtain the detected quantity of the emitted semiconductor laser beam in said user data region.

4. An optical information reproducing apparatus according to claim 1, wherein said semiconductor laser output control means performs the control of the quantity of the semiconductor laser beam to be emitted to the predetermined value such that said semiconductor laser output control means performs the detection of the quantity of the emitted semiconductor laser beam plural times at predetermined time intervals, omits detected data among a plurality of results of the detection and considered to be performed in a period in which a region except said user data region of said recording medium is irradiated with the semiconductor laser beam, and uses a result of calculations of residual detected data as the detected quantity of the laser beam emitted by said semiconductor laser which is emitting the semiconductor laser beam in said user data region.

5. An optical information reproducing apparatus according to claim 4, wherein said semiconductor laser output control means performs plural times the detection of the quantity of the emitted semiconductor laser beam at the time intervals that are determined to be ($T_{SCT}-T_X$, $2 \cdot T_{SCT}+T_X$, . . .) calculated by alternately subtracting and adding predetermined time ($T_X$) to and from a time interval which corresponds to time ($T_{SCT}$) in which a beam spot of the semiconductor laser beam moves in one sector of said recording medium (where said predetermined time $T_X$ satisfies $T_{PF}<T_X<T_{MO}$ assuming that time in which said header region is irradiated with the beam spot is $T_{PF}$ and time in which said user data region is irradiated with the beam spot is $T_{MO}$), and at least a maximum value and/or a minimum value of the plural detected values obtained in the plural operations for detecting the quantity of the emitted semiconductor laser beam is omitted and an average of residual detected values is used as the detected quantity of the laser beam emitted by said semiconductor laser which is emitting the semiconductor laser beam in said user data region.

6. An optical information reproducing apparatus according to claim 4, wherein said semiconductor laser output control means performs plural times the detection of the quantity of the emitted semiconductor laser beam at the time intervals that are determined to be ($T_{SCT} \times A + T_X$) calculated by adding predetermined time ($T_X$) to a multiplicity or a fraction of a time interval which corresponds to time ($T_{SCT}$) in which a beam spot of the semiconductor laser beam moves in one sector of said recording medium (where said predetermined time $T_X$ satisfies $T_{PF}<T_X<T_{MO}$ assuming that time in which said header region is irradiated with the beam spot is $T_{PF}$ and time in which said user data region is irradiated with the beam spot is $T_{MO}$ and $A=0$, N or $1/N$ assuming that N is an integer not less than 1), and at least a maximum value and/or a minimum value of the plural detected values obtained in the plural operations for detecting the quantity of the emitted semiconductor laser beam is omitted and an average of residual detected values is used as the detected quantity of the laser beam emitted by said semiconductor laser which is emitting the semiconductor laser beam in said user data region.

7. An optical information reproducing apparatus according to claim 1, wherein, in a case where said optical recording medium for reproducing information has, in a mixed manner in one recording medium, a recording and reproducing track region, which is composed of said header region and said user data region and which enables information to be rewritten, and a reproduction-only track region which has information in said data region in the form of pits formed at the time of manufacturing said recording medium as well as information in said header region and which inhibits rewriting of information, said semiconductor laser output control means performs the control of the quantity of the semiconductor laser beam to be emitted to the predetermined value such that a desired quantity of the semiconductor laser beam to be emitted at the time of irradiating said reproduction-only track region is made to be a value different from a desired quantity of the semiconductor laser beam emitted at the time of irradiating said recording and reproducing track region.

8. An optical information reproducing apparatus for reproducing from an optical recording medium by irradiating said recording medium, said recording medium having a recording and reproducing and information-rewritable track region, which is composed of a header region having information, such as a sector start mark, track number and sector number, in a pit shape formed when said recording medium has been manufactured and a recording and reproducing user data region that has no pit and enables information to be recorded and reproduced, and a reproduction-only track region which has information in said data region in the form of pits formed at the time of manufacturing said recording medium as well as information in said header region and which inhibits rewriting of information in such a manner that said two track regions being present in one recording medium in a mixed manner, said optical information reproducing apparatus comprising;

semiconductor laser output control means for performing control of a quantity of a semiconductor laser beam to be emitted to a predetermined value such that a desired quantity of the semiconductor laser beam to be emitted at the time of irradiating said reproduction-only track region is made to be a value different from a desired quantity of the semiconductor laser beam emitted at the time of irradiating said recording and reproducing track region.

9. An optical information reproducing apparatus according to claim 8, wherein said semiconductor laser output control means sets a desired quantity of the semiconductor laser beam to be emitted to irradiate said recording and reproducing track region to a predetermined value that corresponds to a mounted recording medium, and a desired quantity of the semiconductor laser beam to be emitted to irradiate said reproduction-only track region to a value that is determined in accordance with a result of a detection of a quantity of the emitted semiconductor laser beam in a state where a drive electric current has been supplied to said semiconductor laser after an optical head has been moved from said recording and reproducing track region to said reproduction-only track region, said electric current having the same value as that of a drive electric current that has been supplied to said semiconductor laser before commencement of the movement of said optical head.

10. An optical information reproducing apparatus according to claim 9, wherein said semiconductor laser output control means performs the detection of the quantity of the emitted semiconductor laser beam to be performed after said optical head has been moved from said recording and reproducing track region to said reproduction-only track region, said detection being performed after a predetermined time has passed from a moment information in said header region in said reproduction-only track region has been reproduced to obtain a detected value of the semiconductor laser beam emitted in said data region having information in the form of pits.

11. An optical information reproducing apparatus according to claim 8, wherein said semiconductor laser output control means controls the quantity of the semiconductor laser beam to be emitted in such a manner that said semiconductor laser output control means sets a desired quantity of the semiconductor laser beam to be emitted to irradiate said reproduction-only track region to be a value obtained by correcting an influence of returned light occurring due to presence and absence of the pits upon a desired quantity of the semiconductor laser beam to be emitted to irradiate said recording and reproducing track region, and maintains a drive electric current to be supplied to said semiconductor laser in said reproduction-only track region at a value of a drive electric current to be supplied in said data region in said recording and reproducing, said data region having no pit.

12. An optical information reproducing apparatus according to claim 8, wherein said semiconductor laser output control means sets a desired quantity of the semiconductor laser beam to be emitted to irradiate said reproduction-only track region in such a manner that said semiconductor laser output control means detects the quantity of the emitted semiconductor laser beam in a state where a drive electric current having the same value as that supplied to said semiconductor laser before movement of said optical head is commenced after said optical head has been moved from said recording and reproducing track region to said reproduction-only track region is supplied to said semiconductor laser to detect an influence of returned light occurring due to presence and absence of the pits so that said value is set in accordance with a result of detection.

13. An optical information reproducing apparatus according to claim 12, wherein said semiconductor laser output control means performs the detection of the quantity of the emitted semiconductor laser beam to be performed after said optical head has been moved from said recording and reproducing track region to said reproduction-only track region, said detection being performed after a predetermined time has passed from a moment information in said header region in said reproduction-only track region has been reproduced and the detection of the emitted semiconductor laser beam is performed in said data region while avoiding a sector mark portion formed in the leading portion of said header region and an offset detection field formed between said header region and said data region and having no pit.

14. An optical information reproducing apparatus according to claim 8, wherein said semiconductor laser output control means is composed of a circuit system that compares, by digital numerals, a detected value of the quantity of the emitted semiconductor laser beam and said desired value of the same to control the quantity of the semiconductor laser beam to be emitted in such a manner that error between said detected value and said desired value is made to be zero.

15. An optical information reproducing apparatus according to claim 8, wherein said semiconductor laser output control means is composed of a circuit system that compares, by analog voltage values, a detected value of the quantity of the emitted semiconductor laser beam and said desired value of the same to control the quantity of the semiconductor laser beam to be emitted in such a manner that error between said detected value and said desired value is made to be zero.

16. An optical information reproducing apparatus for reproducing information from an optical recording medium by irradiating said recording medium, said recording medium having a recording and reproducing and information-rewritable track region, which is composed of a header region having information, such as a sector start mark, track number and sector number, in a pit shape formed when said recording medium has been manufactured and a recording and reproducing user data region that has no pit and enables information to be recorded and reproduced, and a reproduction-only track region which has information in said data region in the form of pits formed at the time of manufacturing said recording medium as well as information in said header region and which inhibits rewriting of information in such a manner that said two track regions being present in one recording medium in a mixed manner, said optical information reproducing apparatus comprising;

semiconductor laser output control means for performing detection of the quantity of the laser beam emitted by a semiconductor laser which is a light source for irradiating said recording medium with the semiconductor laser beam in such a manner that the detection is stopped in a period in which said header region is irradiated with the semiconductor laser beam and the detection is performed in said data region in said recording and reproducing track region having no pit or in said date region in said reproduction-only track region and having information in the form of pits, said semiconductor laser output control means performing control of a quantity of a semiconductor laser beam to be emitted to a predetermined value such that a desired quantity of the semiconductor laser beam to be emitted at the time of irradiating said reproduction-only track region is made to be a value different from a desired quantity of the semiconductor laser beam emitted at the time of irradiating said recording and reproducing track region.

* * * * *